US010028427B2

(12) United States Patent
Arnett et al.

(10) Patent No.: US 10,028,427 B2
(45) Date of Patent: Jul. 24, 2018

(54) DUAL-SEED METERING DEVICE, SYSTEM, AND METHOD OF USE

(71) Applicant: Great Plains Manufacturing, Inc., Salina, KS (US)

(72) Inventors: Gregory W. Arnett, Solomon, KS (US); Paul Galle, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 54 days.

(21) Appl. No.: 14/687,767

(22) Filed: Apr. 15, 2015

(65) Prior Publication Data
US 2015/0289441 A1  Oct. 15, 2015

Related U.S. Application Data

(60) Provisional application No. 61/979,617, filed on Apr. 15, 2014.

(51) Int. Cl.
*A01C 7/04* (2006.01)
*A01C 21/00* (2006.01)

(52) U.S. Cl.
CPC .............. *A01C 7/046* (2013.01); *A01C 7/044* (2013.01); *A01C 21/005* (2013.01)

(58) Field of Classification Search
CPC combination set(s) only.
See application file for complete search history.

(56) References Cited

U.S. PATENT DOCUMENTS

| 4,094,444 A | * | 6/1978 | Willis ..................... A01C 7/16 221/266 |
| 4,285,444 A | * | 8/1981 | Tye ........................ A01C 7/046 221/211 |
| 4,449,642 A | * | 5/1984 | Dooley ................ A01C 15/006 111/34 |
| 4,924,786 A | | 5/1990 | Keeton |
| 6,142,086 A | | 11/2000 | Richard |
| 6,516,733 B1 | * | 2/2003 | Sauder ................ A01C 21/005 111/180 |
| 6,672,228 B1 | | 1/2004 | Groelz et al. |
| 7,765,943 B2 | | 8/2010 | Landphair et al. |
| 8,322,293 B2 | | 12/2012 | Wollhaupt et al. |
| 8,336,470 B2 | | 12/2012 | Rans |

(Continued)

FOREIGN PATENT DOCUMENTS

| EP | 2684436 A1 | 1/2014 |
| EP | 3125669 | 10/2015 |

(Continued)

OTHER PUBLICATIONS

Search Report and Written Opinion dated Jun. 29, 2015 for corresponding PCT Patent Application No. PCT/US2015/026019, 17 pages.

(Continued)

*Primary Examiner* — Alicia Torres
(74) *Attorney, Agent, or Firm* — Hovey Williams LLP

(57) ABSTRACT

A seed meter comprising a housing including one or more air inlets for receiving pressurized air into the housing. The seed meter additionally includes a first metering disc and a second metering disc, each rotatably received in the housing. Each of the first and second metering discs comprises seed pockets for receiving seeds therein.

19 Claims, 13 Drawing Sheets

(56) References Cited

U.S. PATENT DOCUMENTS

| | | | |
|---|---|---|---|
| 8,371,239 B2 | 2/2013 | Rans et al. | |
| 2008/0053350 A1 | 3/2008 | Jones et al. | |
| 2010/0282141 A1* | 11/2010 | Wollenhaupt | A01C 7/06 111/118 |
| 2010/0282142 A1 | 11/2010 | Preheim et al. | |
| 2010/0282144 A1* | 11/2010 | Rans | A01C 7/04 111/185 |
| 2010/0282147 A1 | 11/2010 | Wollenhaupt et al. | |
| 2010/0300341 A1 | 12/2010 | Peterson et al. | |
| 2011/0178632 A1* | 7/2011 | Straeter | A01C 7/10 700/219 |
| 2011/0271887 A1* | 11/2011 | Shoup | A01C 7/046 111/178 |
| 2013/0112125 A1 | 5/2013 | Wollenhaupt et al. | |
| 2015/0059630 A1* | 3/2015 | Kinzenbaw | A01C 7/044 111/200 |
| 2015/0282422 A1* | 10/2015 | Hahn | A01C 7/20 111/185 |
| 2016/0295792 A1* | 10/2016 | Secrest | A01C 21/005 |

FOREIGN PATENT DOCUMENTS

| | | | | |
|---|---|---|---|---|
| WO | WO 2007064184 A2 * | 6/2007 | | A01C 7/044 |
| WO | 2013/183988 A2 | 12/2013 | | |
| WO | 2015154070 A1 | 10/2015 | | |

OTHER PUBLICATIONS

European Search Report dated Oct. 19, 2017 for related European Patent Application No. 15779526.1, 9 pages.

* cited by examiner

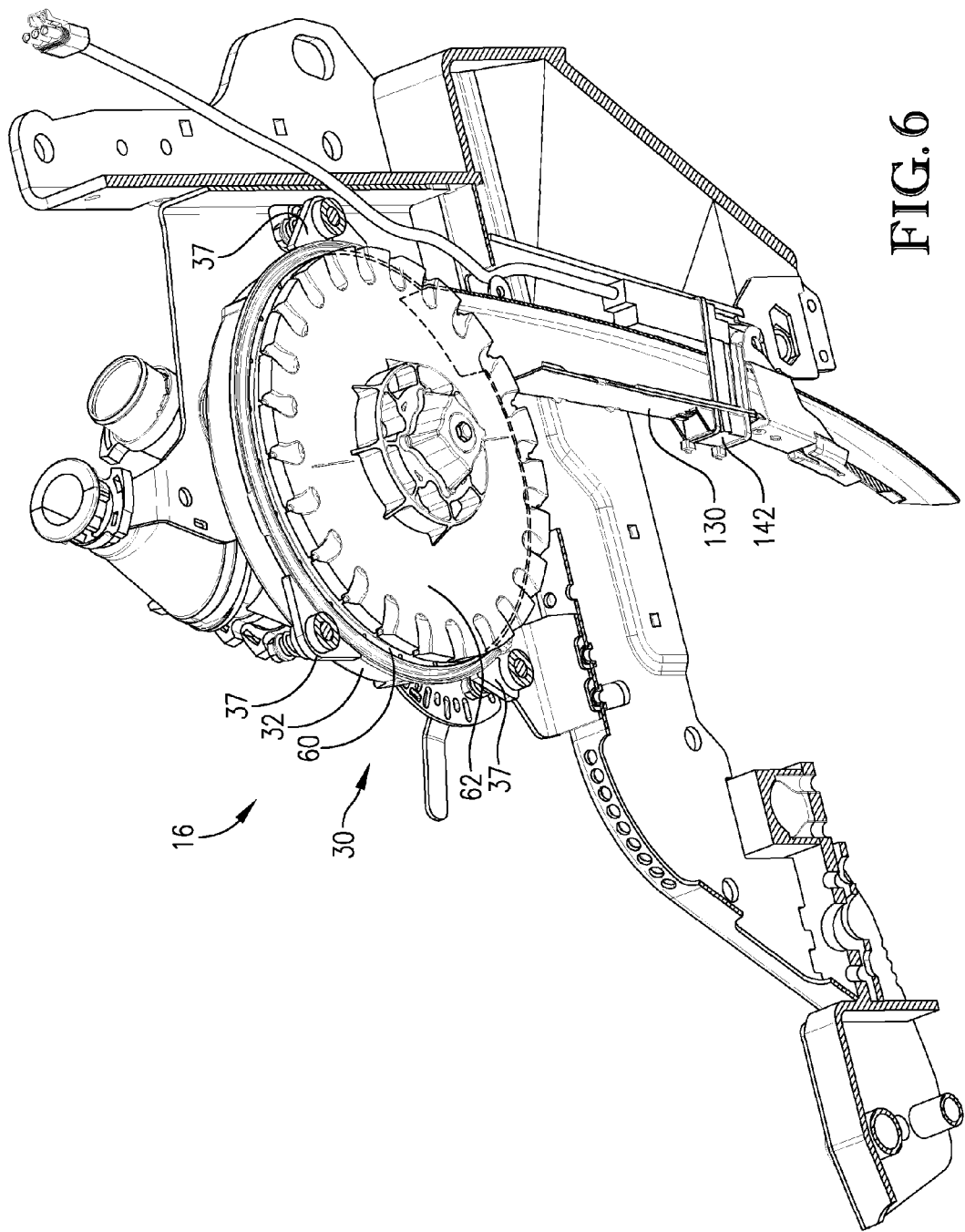

DUAL-SEED METERING DEVICE, SYSTEM, AND METHOD OF USE

CROSS-REFERENCE TO RELATED APPLICATIONS

This non-provisional patent application claims priority to U.S. Provisional Patent Application Ser. No. 61/979,617 filed Apr. 15, 2014, and entitled "DUAL-SEED METERING DEVICE, SYSTEM, AND METHOD OF USE," the entirety of which is herein incorporated by reference.

FIELD

Embodiments of the present invention are directed to a dual-seed metering device, system, and method of use. In more detail, embodiments of the present invention are directed to a seed metering device and system capable of dispensing and/or planting at least two different types of seed into a field. Further, embodiments of the present invention include a plurality of methods for using the dual-seed metering device to dispense and/or plant at least two types of seed into ground soil.

BACKGROUND

Single-seed metering devices are well known. For instance, U.S. Pat. No. 8,375,874, which is herein incorporated by reference in its entirety, discloses a single-seed metering device that can be used with a planting machine. Such a single-seed metering device includes a seed metering disc that comprises a plurality of seed pockets on a single side of the metering disc. As the metering disc rotates through a housing containing seeds, the disc picks up the seeds and retains them in the seed pockets. As the disc rotates, the seeds are held in place within the seed pockets via air-pressure. The seeds are held in place until the seeds are positioned over a dispensing tube, at which point the seeds are drop under the force of gravity into the dispensing tube. The seeds then travel through the dispensing tube where they are dispensed and/or planted within the ground soil. Although such single-seed metering devices are well-equipped for planting a single type of seed, such devices are not capable of efficiently planting more than one type of seed without stopping the planting machine and completely changing out the seed types.

In particular, if a user of single-seed metering device is required to plant more than one type of seed within a field, the user must complete substantial, time-consuming changes to the metering device. For example, once the user has finished planting a first type of seed, the user will have to completely stop the planting machine that is pushing/pulling the metering device through the field. The user will have to empty the metering device entirely of the first type of seed (as well as any seed bins that are feeding the metering device). The user will then be required to re-fill the seed bin with a second type of seed and then re-start the planting process. Furthermore, because of the rotation of the metering disc within the metering device, there will be at least some time period delay between the planting of the first seed and the planting of the second seed. During such time period delay, no seeds will be planted as the metering disc begins to pick up the second seed for planting. As such, the user is required to expend significant amounts of time and effort to plant more than one type of seed with standard, single-seed metering devices.

SUMMARY

Embodiments of the present invention include a seed meter comprising a housing including one or more air inlets for receiving pressurized air into the housing. The seed meter additionally includes a first metering disc and a second metering disc, each rotatably received in the housing. Each of the first and second metering discs comprises seed pockets for receiving seeds therein.

Embodiments of the present invention additionally include a seed planting machine comprising a frame configured to be transported via a tractor, one or more seed bins configured to hold at least a first seed type and a second seed type, and a plurality of dual-seed meters secured to the frame, with each of the dual-seed meters being configured to dispense the first seed type and the second seed type in a single row of a field. Each of the dual-seed meters includes a first metering disc for dispensing the first type of seed and a second metering disc for dispensing the second type of seed.

Embodiments of the present invention additionally include a seed planting machine comprising a frame configured to be transported via a tractor, a first seed bin configured to hold at least a first seed type and a second seed bin configured to hold at least a second seed type, and a plurality of pairs of dual-seed meters secured to said frame, with each of the pair of dual-seed meters being configured to dispense the first seed type and the second seed type in a twin row within a field. Each of said dual-seed meters includes a first metering disc for dispensing the first type of seed and a second metering disc for dispensing the second type of seed.

Embodiments of the present invention additionally include a seed planting method. The method includes step (a) of planting a first type of seed in a first field region using a seed planting machine. The method additionally includes step (b) of planting a second type of seed in a second field region using the seed planting machine. During the planting of step (a), a plurality of seed meters are used to meter the first type of seed. During the planting of step (b), the plurality of seed meters are used to meter the second type of seeds. During said planting of both steps (a) and (b), the seed planting machine simultaneously carries both the first and second types of seeds.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 6 is a partial right-side perspective view of the dual-seed meter from FIGS. 4-5, with a side of a housing removed to illustrate a metering disc within the housing;

Figure 1:
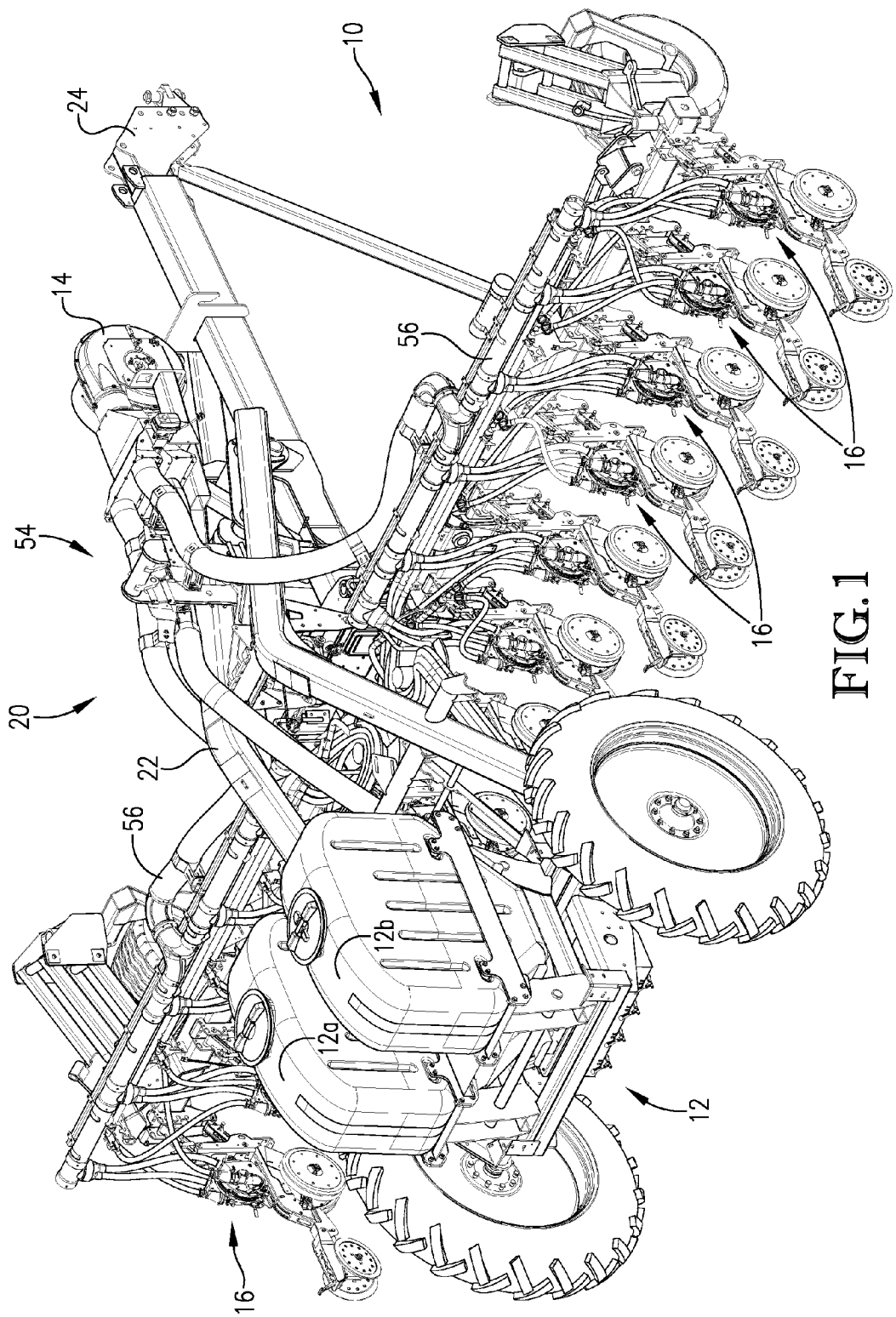
FIG. 1 is a top rear perspective view of a seed planting machine with a dual-seed metering system according to embodiments of the present invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention broadly provides various embodiments of a dual-seed planting system, device, and method of use. In more detail, and with reference to FIGS. 1-2, embodiments of the present invention may comprise a dual-seed metering system 10 that includes at least one bin 12 for holding at least two types of seeds, a pressure differential device 14 for producing an air-pressure differential within the system, and one or more dual-seed meters 16 operable to receive at least two types of seed from the bin 12 and metering the seeds in a controlled manner into the ground soil of a field for planting. In operation, the dual-seed metering system 10 is operable to dispense two or more different types of seeds onto a field in an efficient and controlled manner.

Figure 3:
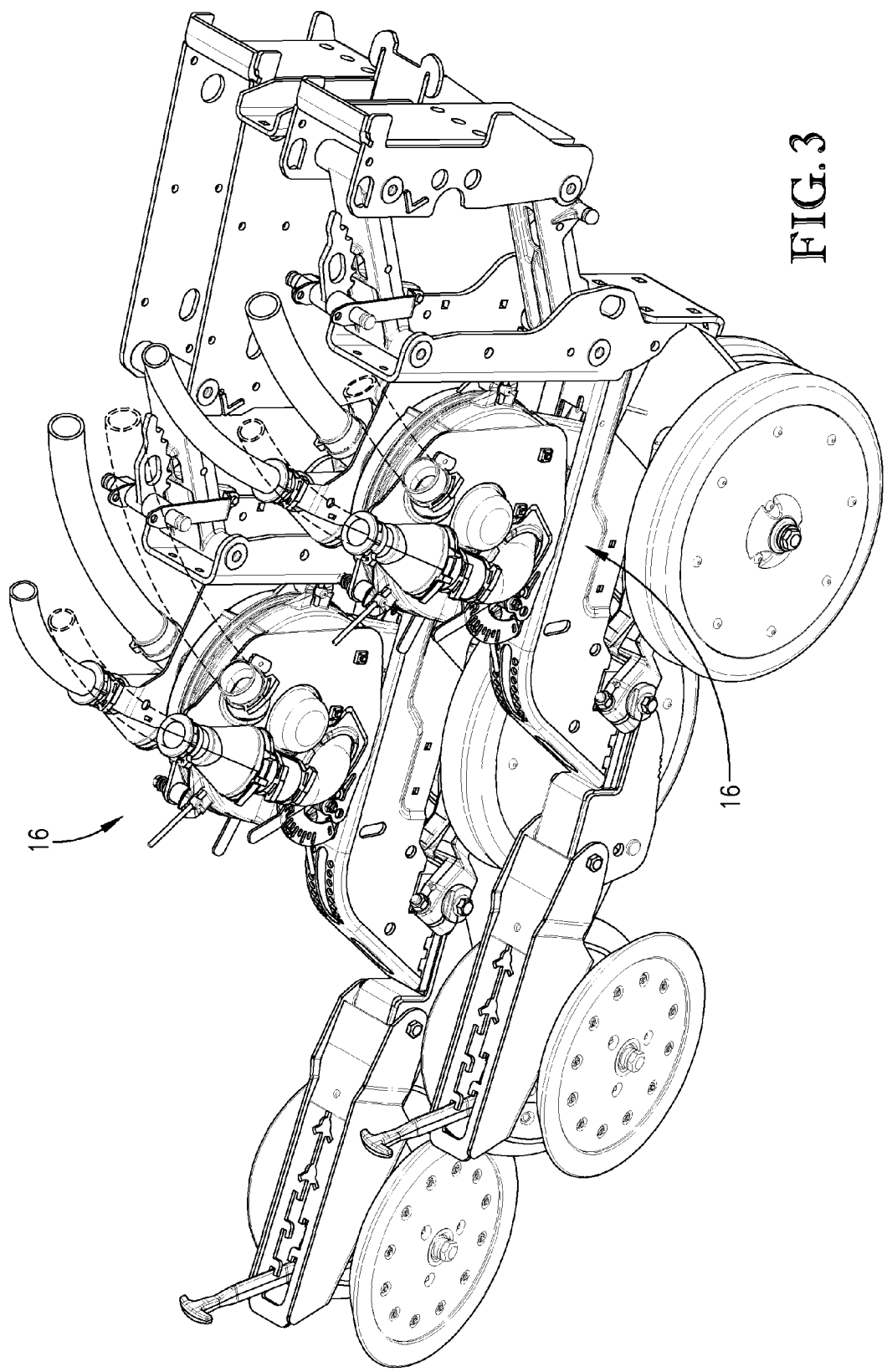
FIG. 3 is a perspective view of a pair of dual-seed meters according to embodiments of the present invention.

The components of the dual-seed metering system may be mounted on a seed planting machine 20 that broadly comprise a frame 22 and a hitch assembly 24. As such, the seed planting machine 20 can be connected to a towing unit (e.g., a tractor) for pulling or pushing the seed planting machine 20 during operation. Exemplary seed planting machines are described in U.S. Pat. Nos. 6,308,645 and 5,497,715, which are herein incorporated by reference in their entireties. As mentioned above, the seed planting machine 20 may include a plurality of dual-seed meters 16 attached to the frame 22. In more detail, each of the dual-seed meters 16 is configured for dispensing seeds (either a first type of seed or a second type of seed) one at a time into the ground soil. A goal of the dual-seed meters 16 is to singulate and drop seeds in a way that provides a desired number of seeds per acre and a uniform spacing between the seeds as they are placed in the ground soil. In some embodiments, the seed planting machine 20 may include at least four dual-seed meters 16, at least eight dual-seed meters 16, at least twelve dual-seed meters 16, or at least twenty dual-seed meters 16. The dual-seed meters 16 may be individually mounted to the frame 22. In such a configuration, the seed planting machine is configured to dispense seed in a plurality of single rows within the ground soil. Alternatively, the dual-seed meters 16 may be mounted to the frame 22 in pairs. For instance, FIG. 3 illustrates a pair of dual-seed meters 16 that are at least partially interconnected via a bracket that can be secured to the frame 22. In some embodiments, the seed planting machine 20 may include at least four pairs of dual-seed meters 16, at least eight pairs of dual-seed meters 16, at least twelve pairs of dual-seed meters 16, or at least twenty pairs of dual-seed meters 16. In such a configuration, the seed planting machine 20 is configured to dispense seed in a plurality of twin rows within the ground soil.

Turning to the seed meter 16 in more detail, and with reference to FIGS. 4-8, the dual-seed meter 16 generally comprises a circular housing 30 having the first side 32 and the second side 34. As perhaps best illustrated by FIGS. 7-8, the seed meter 16 may include first seed inlet 40 located on the first side 32 and a second seed inlet 42 on the second side 34 of the seed meter 16. Similarly, the seed meter 16 may include first air inlet 44 located on the first side 32 and a second air inlet 46 on the second side 34 of the seed meter 16. As such, the seed meter 16 is configured to receive seed via the seed inlets 40, 42 and is configured to receive and/or discharge air via the air inlets 44, 46. Although the embodiments illustrated in the drawings include a seed meter 16 with two seed inlets 40, 42 and two air inlets 44, 46, some embodiments may provide for the housing 30 to include more than two of each type of inlet. In such embodiments, the seed meter 16 may be operable to disseminate more than two types of seeds.

Figure 4:
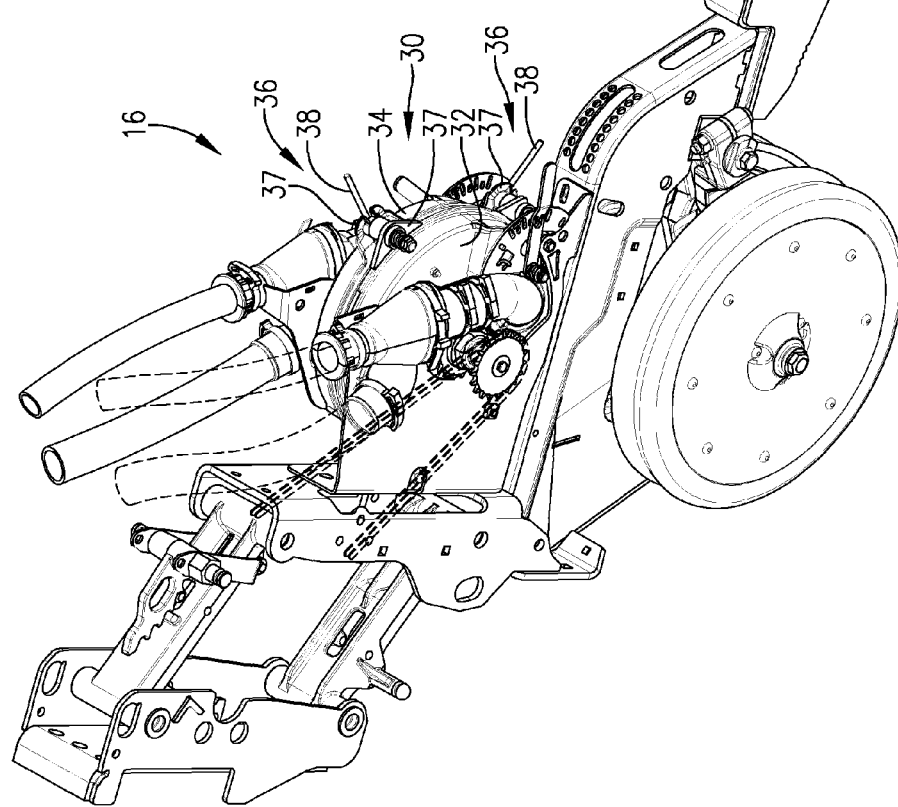
FIG. 4 is a left-side perspective view of a dual-seed meter according to embodiments of the present invention.
Figure 7:
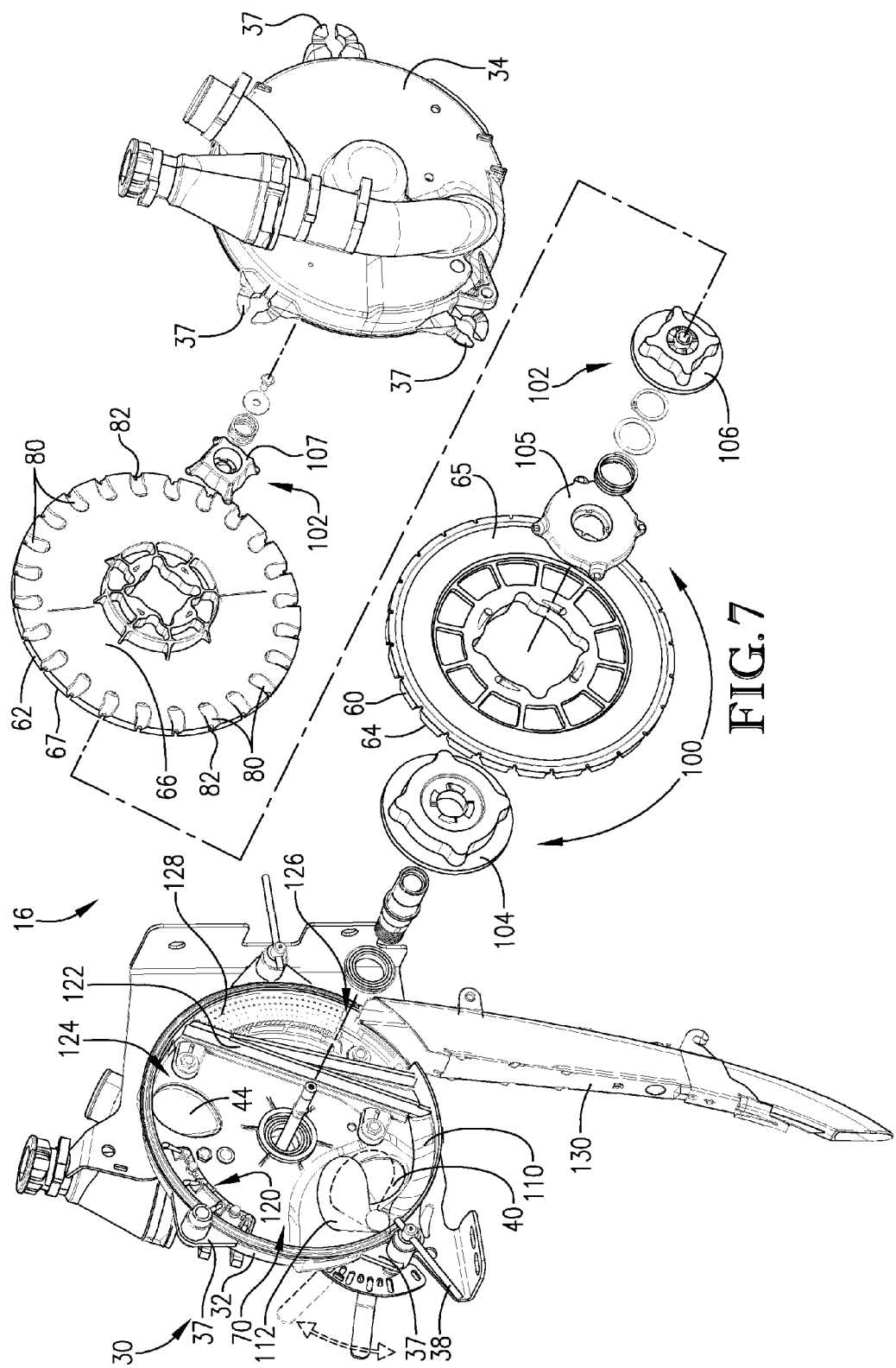
FIG. 7 is a right-side exploded view of the dual-seed meter from FIGS. 4-5, particularly showing an interior side portion of a first side of the housing, and also showing first and second metering discs.
Figure 8:
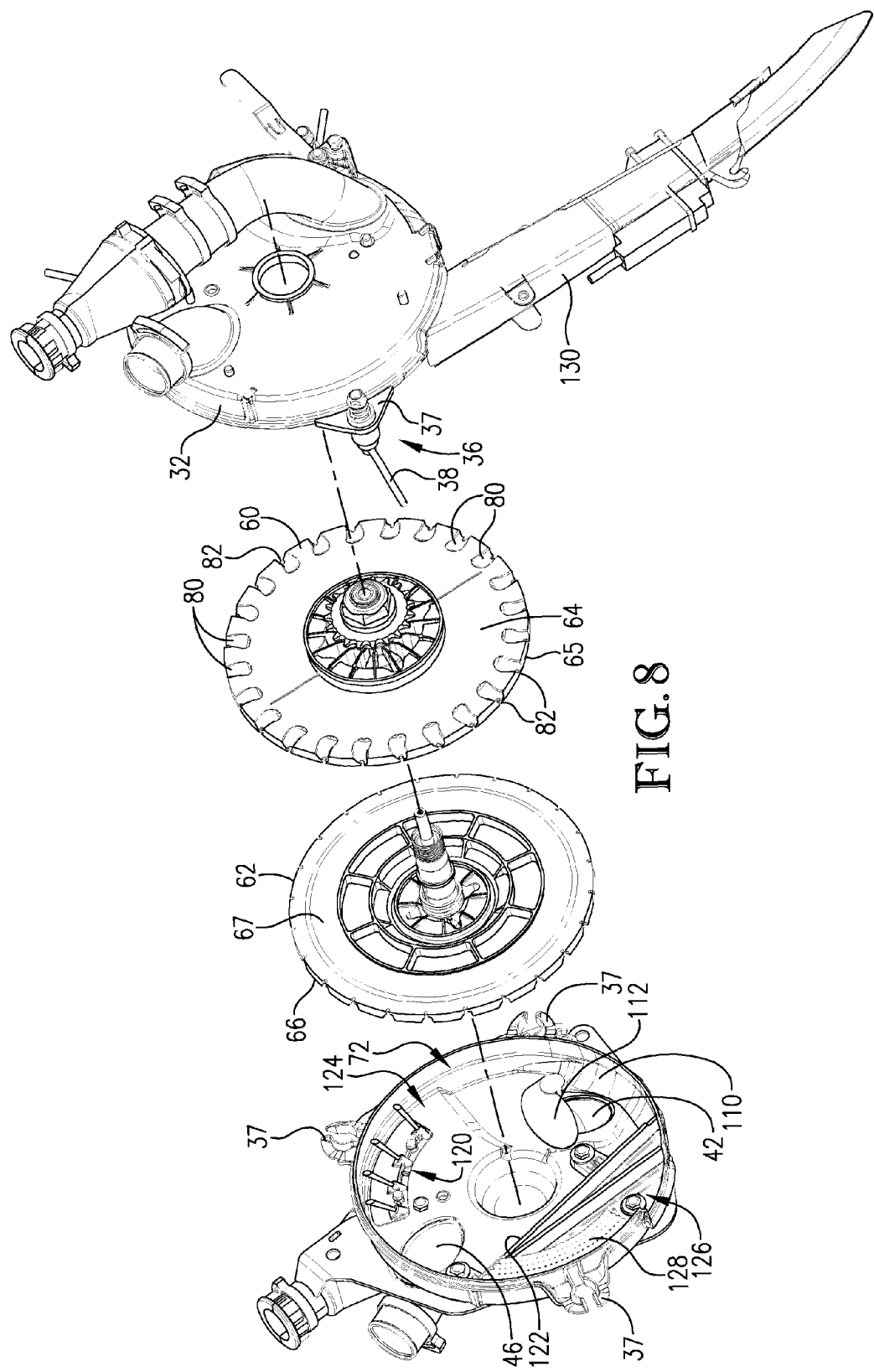
FIG. 8 is a partial left-side exploded view of the dual-seed meter from FIGS. 4-5, particularly showing an interior side portion of a second side of the housing, and also showing first and second metering discs.

The sides 32, 34 of the housing 30 may be connected together via various means of connection such a clips, clasps, fasteners, hinges, or the like. As shown in FIGS. 4 and 7-8, the housing 30 may comprise connector assemblies 36 that allow for quick connection and disconnection of the sides 32, 34. The connector assemblies 36 may comprise connector brackets 37 on each of the sides 32, 34 and a connecting actuator 38 configured to engage with each of the connector brackets 37 to secure the sides 32, 34 together. The brackets 37 are configured such that proper alignment of the sides 32, 34 is required before the connecting actuator 38 can secure the sides 32, 34 together via the brackets 37. As such, the connector assemblies 36 operate as guide elements so as to ensure proper positioning of the sides 32, 34 when connected together. Such proper positioning is beneficial to ensure the components of the dual-seed meter 16 within the housing 30 are free to actuate as required, as will be described in more detail below.

Figure 5:
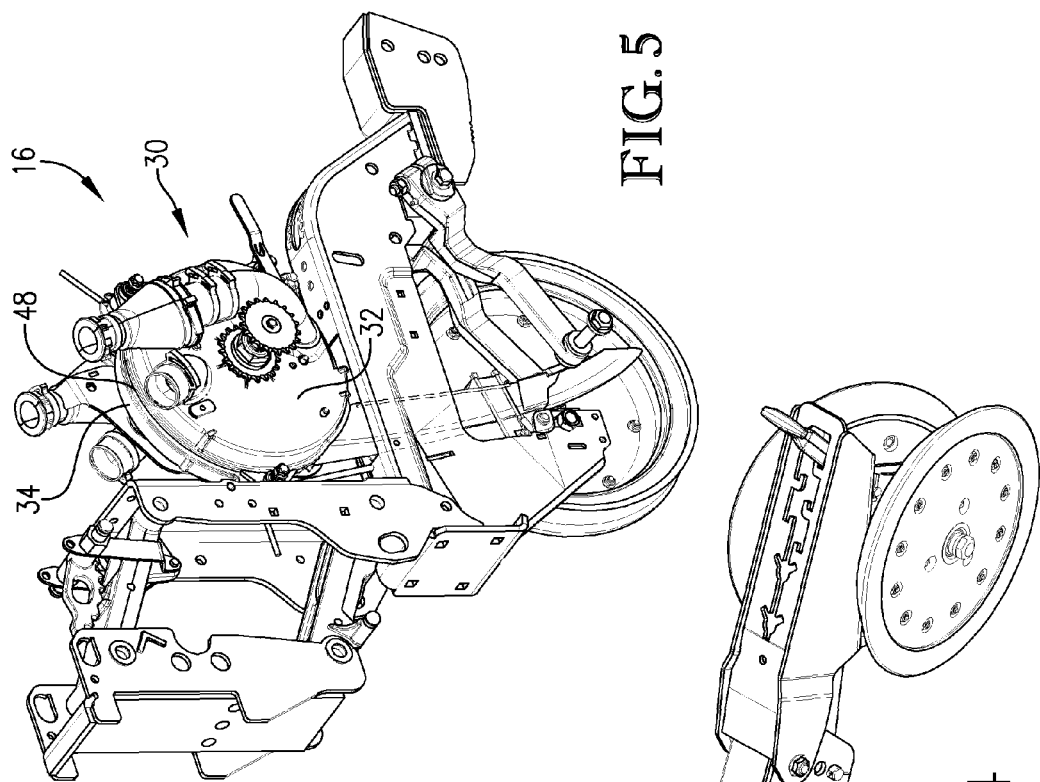
FIG. 5 is a partial rear left-side perspective view of the dual-seed meter from FIG. 4.

Furthermore, in some embodiments, such as illustrated in FIGS. 4-5, the housing 30 will have air flow openings, such as in the form of an air vent gap 48, at its circumference. In particular, the air vent gap 48 is presented as a gap between the first and second sides 32, 34, which permits air to pass from between the housing 30 to outside the housing 30. For example, in instance, in which a positive air pressure is created within the housing 30, the air vent gap 48 may permit air to pass from inside to outside the housing 30. Alternatively, in instances in which a negative air-pressure is created within the housing 30, air may be extracted through the air vent gap 48, such that air will pass from outside to inside the housing 30 via the first and second air inlets 44, 46.

Figure 2:
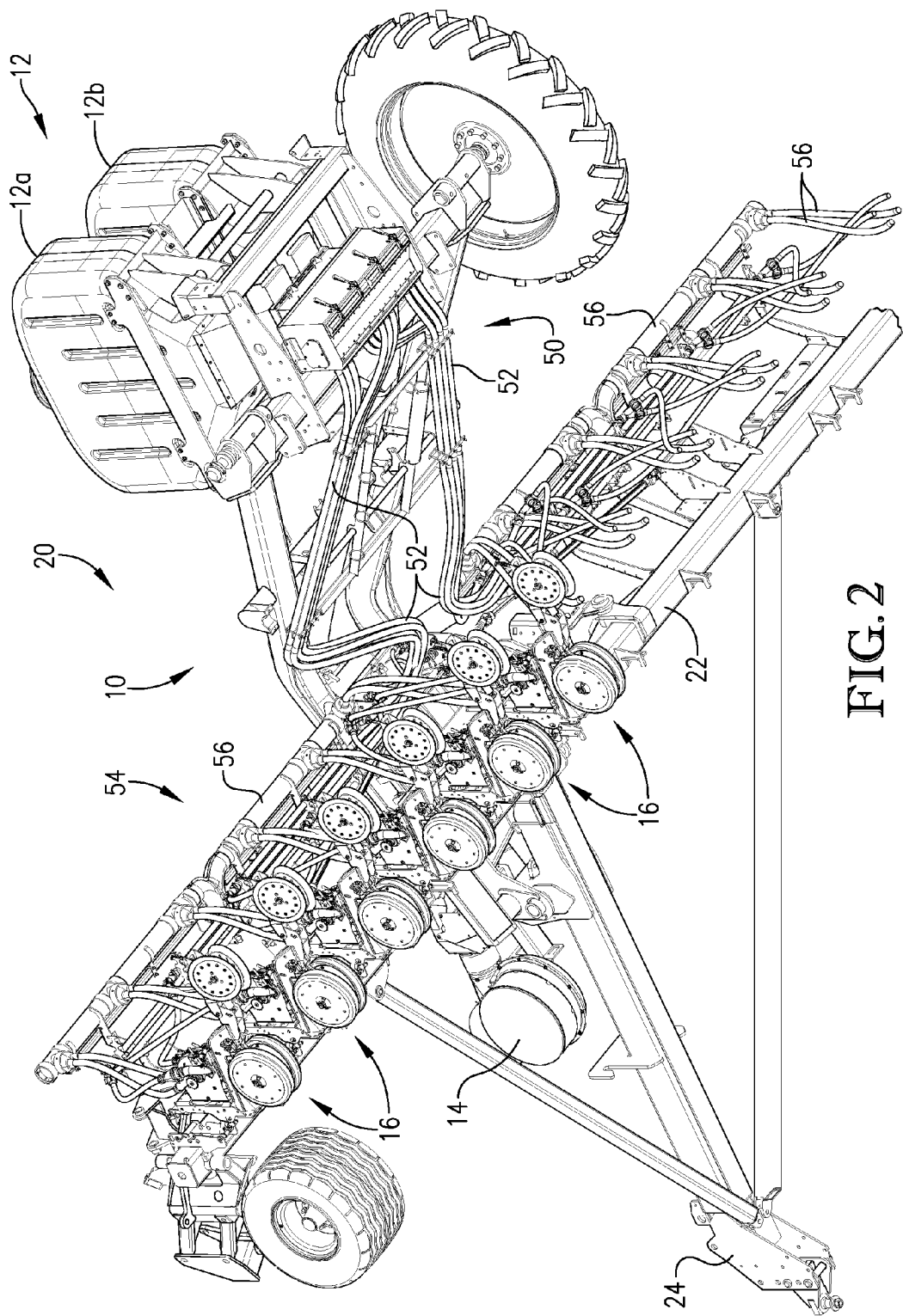
FIG. 2 is a bottom rear perspective view of the seed planting machine from FIG. 1.

Returning back to FIGS. 1-2, the metering system 10 includes the at least one bin 12 capable of holding two or more different types of seeds. In some embodiments, the metering system 10 will include a plurality of bins 12, with each bin 12 in the plurality operable to hold a different type of seed. For instance, FIGS. 1-2 shown an embodiment with two seed bins 12, including a first seed bin 12a configured to hold a first type of seed and a second seed bin 12b configured to hold a second type of seed. In other embodiments, the metering system 10 will include on a single bin 12 divided into two or more individual compartments, such that each compartment of the bin 12 is operable to hold a different type of seed.

Regardless of how many bins 12 are included in the metering system 10, the metering system 10 will include, as best illustrated by FIG. 2, a seed transportation system 50 that extends from the bins 12 to each of the one or more dual-seed meters 16. The seed transportation system 50 may include seed conduits 52 (e.g., piping, tubing, hose, conduits, or the like) configured to pass seeds from the bins 12 to the seed meters 16. As described above, the bins 12 may hold at least two different types of seeds for distribution to the seed meters 16, such that the seed transportation system 50 may direct each of the two types of seeds to each of the dual-seed meters 16. As such, the seed transportation system 50 may include a plurality of individual seed conduits 52 for directing each type of seed to each of the seed meters 16. In some embodiments, such as is shown in the figures, the seed transportation system 50 directs seed to each of the first seed inlet 40 and the second seed inlet 42 of each of the seed meters 16. In particular, as shown in FIGS. 1-2, a first type of seed may be directed from the first bin 12a to the first seed inlet 40 of each of the seed meters 16, and a second type of seed may be directed from the second bin 12b to the second seed inlet 42 of each of the seed meters 16.

In some embodiments, such as when the bins 12 are positioned above the dual-seed meters 16, the seeds may be gravity fed from the bins 12, through the seed conduits 52, and into the dual-seed meters 16. Alternatively, in some embodiments, the seed transportation system 50 will be associated with a pressure differential device, such as pneumatic pump, an air compressor, a vacuum pump, a fan or the like, for facilitating transportation of the seeds fed from the bin 12, through the seed conduits 52, and into the dual-seed meters 16. In some embodiments, the seed transportation system 50 will be associated with the pressure differential device 14, as shown in FIGS. 1-2. For instance, the pressure differential device 14 may be configured to create a positive air-pressure near an outlet of the bins 12 so as to facilitate transportation of the seeds from the bins 12, through the seed conduits 52, and into the dual-seed meters 16.

Remaining with FIGS. 1-2, the dual-seed metering system 10 may additionally include a pneumatic system 54 for producing an air-pressure differential within various portions of the metering system 10. In some embodiments, the pneumatic system 54 will include a pressure differential device, which may comprise a pneumatic pump, an air compressor, a vacuum pump, a fan or the like or the like. In some embodiments, the pneumatic system 54 will be associated with the pressure differential device 14, as shown in FIGS. 1-2. In such embodiments, the pressure differential device 14 may be commonly associated with both the pneumatic system 54 and the seed transportation system 50. The pressure differential device 14 may be powered electronically, mechanically, hydraulically, or the like. Regardless of how the pressure differential device 14 is powered, the pneumatic system 54 will include air conduits 56 that extend from the pressure differential device 14 to each of the seed meters 16. The air conduits 56 may comprise piping, tubing, hose, conduits, or the like, and are operable to facilitate the flow of air from the pressure differential device 14 to the seed meters 16 (i.e., a positive air-pressure differential), or alternatively, to facilitate the flow of air from the seed meters 16 to the pressure differential device 14 (i.e., a negative air pressure differential). As shown in the figures, the air conduits 56 may direct air to/from each of the first air inlet 44 and/or the second air inlet 46 of each the seed meters 16. As such, the pneumatic system 54 may include a plurality of individual air conduits 56 for directing air to/from the first and second inlets 44, 46 of each of the seed meters 16.

Returning to the seed meter 16, as perhaps best illustrated by FIGS. 7-8, within the housing 30 is a pair of rotatable metering discs. The pair of metering discs includes a first metering disc 60 and a second metering disc 62. The first metering disc 60 comprises an outer-facing surface 64 facing the first side 32 of the housing 30 and an inner-facing surface 65 facing the second side 34 of the housing 30. The second metering disc 62 comprises an outer-facing surface 66 facing the second side 34 of the housing 30 and an inner-facing surface 67 facing the first side 32 of the housing 30. With the metering discs 60, 62 positioned within the housing 30, the metering discs 60, 62 divide an interior space of the housing 30 into a first interior side 70 (See FIG. 7) that extends from the first side 32 of the housing 30 to the first metering disc 60, and a second interior side 72 (See FIG. 8) that extends from the second side 34 of the housing 30 to the second metering discs 62.

The first and second metering discs 60, 62 each includes a plurality of seed pockets 80 spaced around a circumference of their outer-facing surfaces 64, 66. In some embodiments, each of the seed pockets 80 includes an air opening 82 at a peripheral edge of the metering discs 60, 62. The pockets 80 may be formed with different shapes and sizes to accommodate different seeds and seed sizes. Furthermore, in some embodiments the seed pockets 80 on the first metering disc 60 may have a first size and/or shape, while the seed pockets 80 on the second metering disc 62 may have a second size and/or shape. As such, a single dual-seed meter 16 can use the two metering discs 60, 62 to disseminate at least two different types of seed. In other embodiments, the first size and shape can be the same as the second size and shape, such that the metering discs 60, 62 are configured to disseminate the same type of seeds.

In some embodiments of the present invention, the metering discs 60, 62 may each be formed from a solid piece of material. As such, the metering discs 60, 62 may be formed from an injection molding process or the like. In other embodiments, the metering discs 60, 62 may be formed from two or more pieces that are coupled together. For example, the outer-facing surface 64 of the first metering disc 60 may be part of a first piece that is coupled with the inner-facing surface 65, which is part of a second piece. Similarly, the second metering disc 62 may be formed from coupled first and second pieces, with such pieces forming the outer-facing surface 66 and the inner-facing surface 67, respectively.

Figure 9:
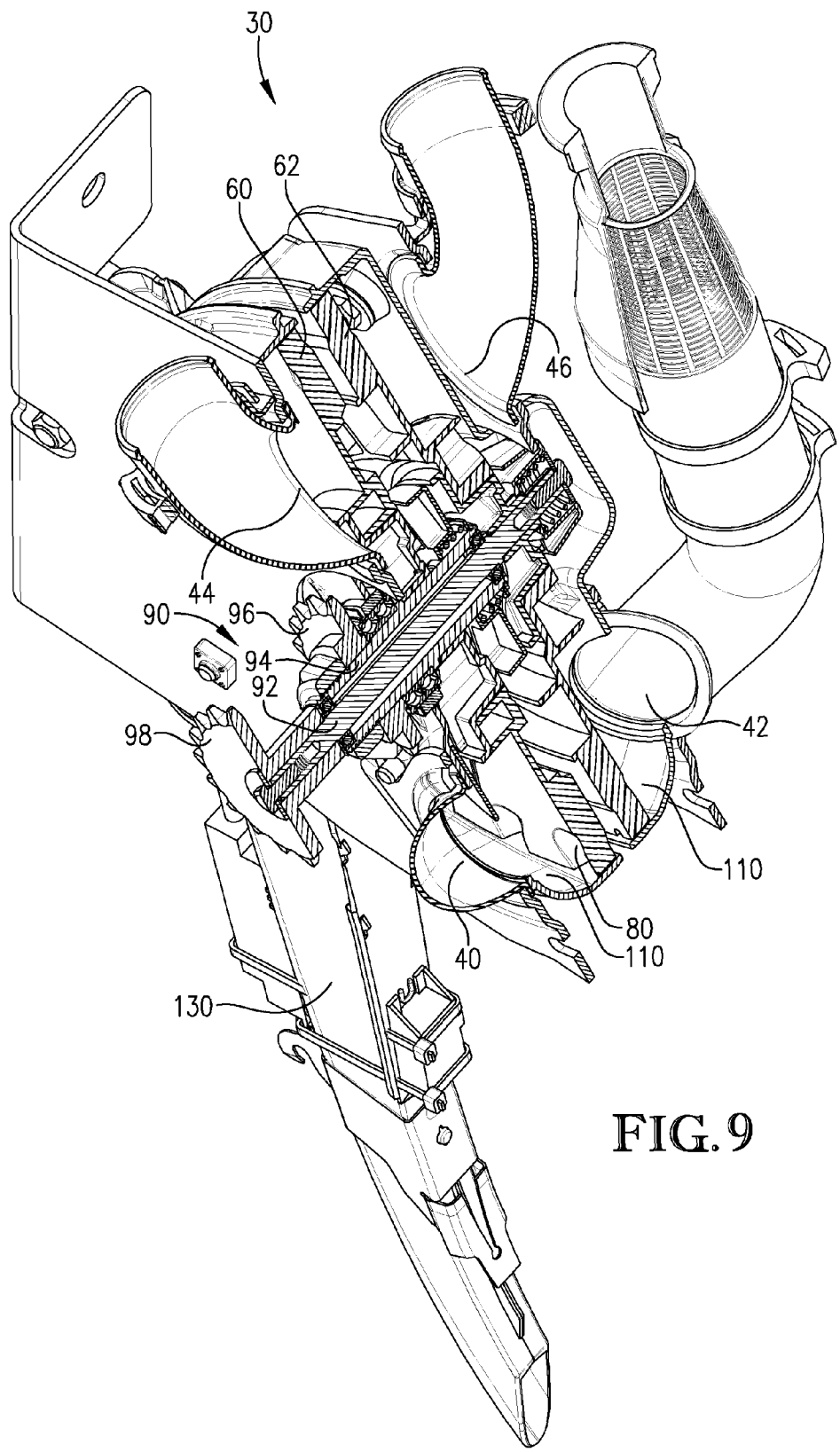
FIG. 9 is a cross-section view of the dual-seed meter from FIGS. 4-5, particularly first and second metering discs rotatably secured within a housing via a drive assembly.

The metering discs 60, 62 are configured to independently rotate within the housing 30 about a drive assembly 90, as perhaps best illustrated in FIG. 9. A portion of the drive assembly 90 extends through the housing 30 and through each of the metering discs 60, 62. The drive assembly 90 comprises an inner axle 92 received within an outer axle 94. The inner and outer axles 92, 94 are configured to rotate independently with respect to each other. The drive assembly 90 further includes a first drive component 96 connected to the outer axle 94, while a second drive component 98 is connected to the inner axle 92. As illustrated in the figures, the drive components 96, 98 are located outside of the housing 30. The drive components 96, 98 may comprise sprockets, gears, or other mechanism capable of receiving rotary motion from driving mechanisms, such as chains, driveshafts, gear assemblies, or the like (See, e.g., FIG. 4). The driving mechanisms may themselves receive power from a power generation system associated with the seed planting machine 20 and/or the metering system 10, such as an electric motor or combustion engine powering a rotating shaft, a power takeoff, a hydraulic actuator, a pneumatic actuator, or the like. For instance, the driving mechanisms may be mechanical gears that are rotated by a power take-off connected with the towing unit (e.g., the tractor).

Regardless of the type of power generation system, the driving mechanisms 96, 98 can be independently controlled, such that an operator of the dual-seed metering system 10 can individually actuate either the first drive component 96 individually, the second drive component 98 individually, and/or the first and second drive components 96, 98 simultaneously. As should be understood, actuation of the first drive component 96 causes the first metering disc 60 to rotate, while actuation of the second drive component 98 causes the second metering disc 62 to rotate. To accomplish such individual selection of the drive components 96, 96 (and thus the metering discs 60, 62), the power generation system may include a clutch assembly that allows the power generation system to selectively actuate either the first or second drive components 96, 98 via the driving mechanisms (e.g., drive-chains). Alternatively, the power generation system may comprise two sets of components (e.g., two rotating shafts each powered by a power takeoff). Each of such individual sets of components may be controlled for purposes of selectively actuating either the first or second drive components 96, 98. In still further embodiments, to selectively actuate the metering discs 60, 62, the drive assembly 90 may include an internal clutch (not shown) that is configured to permit rotation of either the first metering disc 60 or the second metering disc 60 upon actuation of a single drive component. In such embodiments, only a single drive component (e.g. a sprocket) and a single driving mechanism (e.g., drive chain) may be required. Such an internal clutch may be controlled by a control system of the metering system 10, which will be described in more detail below.

As best illustrated in FIG. 7, the metering discs 60, 62 are held in place on the drive assembly 90 via drive hubs. In particular, the drive assembly 90 includes a first hub 100 for securing the first metering disc 60 to the drive assembly 90 and a second hub 102 for securing the second metering disc 62 to the drive assembly 90. The drive hubs 100 102 are operable to impart rotary motion from the axles 92, 94 the metering disc 60, 62. In particular, the first drive hub 100 includes a hub seat 104 and a hub cap 105. The first metering disc 60 is configured to be sandwiched between the hub seat 104 and the hub cap 105 such that the hub seat 104 and the hub cap 105 can, in conjunction with the outer axle 94, can impart rotary motion to the first metering disc 60. Similarly, the second drive hub 102 includes a hub seat 106 and a hub cap 107. The second metering disc 62 is configured to be sandwiched between the hub seat 106 and the hub cap 107 such that the hub seat 106 and the hub cap 107, in conjunction with the inner axle 92, can impart rotary motion from the inner axle 92 to the second metering disc 62.

To facilitate rotation of the metering discs 60, 62, the metering discs 60, 62 may have outer diameters that are at least slightly smaller than an inner diameter of the housing 30. In particular, the outer diameters of the metering discs 60, 62 are sized such that the metering discs 60, 62 are free to rotate within the housing 30. Nevertheless, the outer diameters of the metering discs 60, 62 are sufficiently similar to the inner diameter of the housing 30 to prevent solid material, such as seeds, to pass between the outer edge (i.e., the circumference) of the metering discs 60, 62 and the housing 30. Thus, solid materials are generally prevented from passing from the first interior side 70 of the housing 30 to the second interior side 72.

With reference to FIG. 7, the interior workings of the seed meter 16 will now be described in detail. FIG. 7 illustrates the first side 32 and the first interior side 70 of the seed meter 16. It being understood that the second side 34 and the second interior side 72, as shown in FIG. 8, exist opposite the metering discs 60, 62 and are similar in all respects as the first side 32 and first interior side 70 (i.e., the components of the seed meter 16 described below with respect to the first side 32 and the first interior side 70 have mirror components associated with the second side 34 and the second interior side 72). The first interior side 70 includes the first seed inlet 40, which is configured to receive a first type of seed via seed transport system 50. The first type of seed enters the first seed inlet 40 and fills a seed pool cavity 110, with the seed pool cavity 110 defined as a spatial cavity between the first side 32 of the housing 30 and the outer-facing surface 64 of the first metering disc 60 (See also FIG. 9). As the seeds enter through the first seed inlet 40, the seeds fill the seed pool cavity 110 and the pool of seeds within the cavity 110 grows. In certain embodiments, a size of the seed pool cavity 110 may be controlled by a valve 112 operable to control the flow of seeds through the first seed inlet 40. In certain embodiments, the valve 112 may be in the form of a shutter operable to rotatably open or close about the first seed inlet 40. In some embodiments, the valve 112 is actuated by a solenoid, piston, or any other type of actuation mechanism. In other embodiments, the valve 112 is hand actuated. In some embodiments, the valve 112 may be biased in an open or closed position via a spring. In a closed position, the valve 112 can restrict all seed form entering the first interior side 70 into the seed pool cavity 110 through the first seed inlet 40. The valve 112 can be positioned in a plurality of open positions with respect to the first seed inlet 40, with each open position corresponding to a particular amount of seed allowed within the seed pool cavity 110 of the first interior side 70 (i.e., a size of the seed pool).

In operation, with the valve 112, associated with the first interior side 70, in an open position and the seed pool cavity 110 within the first interior side 70 having an amount of seeds therein, the first metering disc 60 is operable to rotate within the housing 30 through the seed pool. It should be noted that in some embodiments, the valve 112 may, at all times, remain fully opened, such that the seed pool cavity 110 remains consistently filled with seed. In further alternative embodiments, the seed meter 16 may not include a valve 112, such that the seed pool cavity 110 remains consistently filled with seed. As the first metering disc 60 rotates, seeds are captured by the seed pockets 80 on the outer-facing surface 64 of the first metering disc 60, and carried along the rotation of the metering disc 60. The seeds may be retained in the seed pockets 80 via an air-pressure differential provided by the pressure differential device 14 fluidly connected to the first air inlet 44 via the air conduits 56 of the pneumatic system 54. As such, embodiments provide for a positive air-pressure differential to be produced between the interior of the housing 30 and the exterior of the housing 30. In more detail, the positive air-pressure differential can be created between the first interior side 70 of the housing 30 and exterior to the housing 30 (i.e., the ambient). As such, the air-pressure within the first interior side 70 will be higher than ambient air-pressure outside of the housing 30. The air-pressure differential is generated by the pressure differential device 14, which is operable to introduce air into the first interior side 70 through the first air inlet 44, via the air conduit 56. The increased air-pressure within the first interior side 70 will cause air to escape from within the housing 30 through the air openings 82 of the seed pockets 80 and finally to the air vent gap 48 of the housing 30 to the ambient. Thus, an air-pressure differential between the first interior side 70 of the housing 30 and the ambient is sufficient to retain the seeds within the seed pockets 80 on the first interior side 70 of the first metering disc 60 while the first metering disc 60 rotates about the housing 30.

Remaining with FIG. 7, the first interior side 70 may also include a tickler brush 120 with a number of knock-down extension members extending towards the first metering disc 60. The tickler brush 120 is operable to knock-down (i.e., remove) extra seeds from within each of the seed pockets 80 as the seed pockets 80 rotate past the tickler brush 120. As such, the tickler brush 120 ensures that each seed pocket 80 contains only a single seed. The first metering disc 60 continues to rotate through the housing 30 and through an air cutoff shelf 122. The air cutoff shelf 122 separates the first interior side 70 into a pressure differentialized portion 124 and a non-pressure differentialized portion 126. In the pressure differentialized portion 124 of the first interior side 70, the seeds in the seed pockets 80 are held in place by the air-pressure differential created by the pressure differential device 14. Contrastingly, in the non-pressure differentialized portion 126 of the first interior side 70, the seeds in the seed pockets 80 are held in place mechanically, via an air cutoff brush 128. The air cutoff brush 128 is configured to hold the seeds within the seed pockets 80 until the seeds are rotated within the first metering disc 60 past the air cutoff brush 128 and over a dispensing tube 130 that extends down from the housing 30 to a position adjacent to the ground soil. Once over the dispensing tube 130, the seeds will drop down the dispensing tube 130, due to gravity, where the seeds are dispensed into the ground soil.

Although the above-described components were described with respect to the first side 32 and the first interior side 70 of the housing 30, the seed meter 16 includes corresponding components within and/or associated with the second side 34 and the second interior side 72 of the housing 30, as is shown in FIG. 8. For example, the seed meter 16 includes an additional seed pool cavity 110, valve 112, tickler brush 120, air cutoff shelf 122, and air cutoff brush 128 within and/or associated with the second side 34 and/or the second interior side 72. It is understood, however, that each of the first and second metering discs 60, 62 drop their respective seeds down the same dispensing tube 130. The components within and/or associated with the second side 34 and the second interior side 72 operate in the same manner as the components within the first side 32 and the first interior side 70, such that seeds introduced into the second interior side 72 can be systematically carried, one-at-a-time, by the rotating second metering disc 62 and dropped down the dispensing tube 130.

For example, with reference to FIG. 8, with valve 112 associated with the second side 34 in an open position and the seed pool cavity 110 within the second interior side 72 having a corresponding amount of seeds therein, the second metering disc 62 is operable to rotate within the housing 30 through the seed pool 110. As previously discussed, in some embodiments, the valve 112 may, at all times, remain fully opened, such that the seed pool cavity 110 remains consistently filled with seed. In further alternative embodiments, the second side 34 of the seed meter 16 may not include a valve 112, such that the seed pool cavity 110 remains consistently filled with seed. Regardless, as the second metering disc 62 rotates, seeds are captured by the seed pockets 80 on the outer facing surface 66 of the second metering disc 62, and carried along the rotation of the second metering disc 62. The seeds may be retained in the seed pockets 80 via an air-pressure differential provided by the pressure differential device 14 fluidly connected to the second air inlet 46 on the second side 34 of the seed meter 16. As such, embodiments provide for a positive air-pressure differential to be produced between the interior of the housing 30 and the exterior of the housing 30. In more detail, the positive air-pressure differential can be created between the second interior side 72 of the interior of the housing 30 and the exterior of the housing 30 (i.e., the ambient). As such, the air-pressure within the second interior side 72 will be higher than ambient air-pressure outside of the housing 30. The air-pressure differential is generated by the pressure differential device 14, which is operable to introduce air into the second interior side 72 through the second air inlet 46, via the air conduits 56. The increased air-pressure within the second interior side 72 will cause air to escape from within the housing 30 through the air openings 82 of the seed pockets 80 and finally through the air vent gap 48 of the housing 30 to the ambient. Such a pressure differential between the second interior side 72 of the housing 30 and the ambient is sufficient to retain the seeds within the seed pockets 80 on the outer-facing surface 66 of the second metering disc 62, as the second metering disc 62 rotates through the housing 30.

In operation, the dual-seed metering system 10 is operable to quickly and efficiently allow a user to dispense (i.e., plant) two or more different types of seed into the ground soil of a field for planting. To begin, each of the two types of seed may be simultaneously distributed to each of the seed meters 16 from the bins 12 (e.g., bins 12a and 12b) via the seed conduits 52. For instance, a first type of seed may be caused to be distributed, via seed conduits 52, from bin 12a to the first interior side 70 of a given seed meter 16. Similarly, a second type of seed may be caused to be distributed, via the seed conduits 52, from bin 12b to the second interior side 72 of the given seed meter 16. In addition, an air-pressure differential is produced within the housing 30, such that the first and second interior sides 70, 72 have an air-pressure that is higher than an ambient air-pressure. In more detail, pressurized air is provided to the first interior side 70 via the first air inlet 44 and to the second interior side via the second air inlet 46. Such pressurized air may be provided by the pressure differential device 14 that is fluidly connected to the first and second air inlets 44, 46 via the air conduits 56.

To begin planting the first type of seed, and with reference to FIG. 9, the first metering disc 60 is caused to rotate by actuating the first drive component 96, which in turns rotates the outer axle 94, and thereby causes the first metering disc 60 to rotate. As previously described, the first drive component 96 may comprise a gear or sprocket, such that it can be driven by a driving mechanism in the form of a chain. The drive component 96 itself may be driven by a rotating drive shaft that is powered by a motor (electric/combustion) or a power take off. The drive component 96 can be configured to be selectively driven, such as by a clutch or a solenoid that selectively engages the drive component 96 with the rotating drive shaft. Regardless, once the first metering disc 60 is caused to rotate, it is operable to carry/retain the first type of seeds within the seed pockets 80 on the outer-facing surface 64. As such, the first type of seeds can be systematically dispensed down the dispensing tube 130 and into the ground soil, as previously described.

To begin planting the second type of seed, the second metering disc 62 is caused to rotate by actuating the second drive component 98, which in turns rotates the inner axle 92, and thereby causes the second metering disc 62 to rotate. As previously described, the second drive component 98 may comprise a gear or sprocket, such that it can be driven by a driving mechanism in the form of a chain. The drive component 98 itself may be driven by the rotating drive shaft, as previously described. The drive component 98 can be configured to be selectively driven, such as by a clutch or a solenoid that selectively engages the drive component 98 with the rotating drive shaft. Regardless, once the second metering disc 62 is caused to rotate, it is operable to carry/retain the second type of seeds within the seed pockets 80 on the outer-facing surface 66. As such, the second type of seeds can be systematically dispensed down the dispensing tube 130 and into the ground soil, as previously described.

Figure 10:
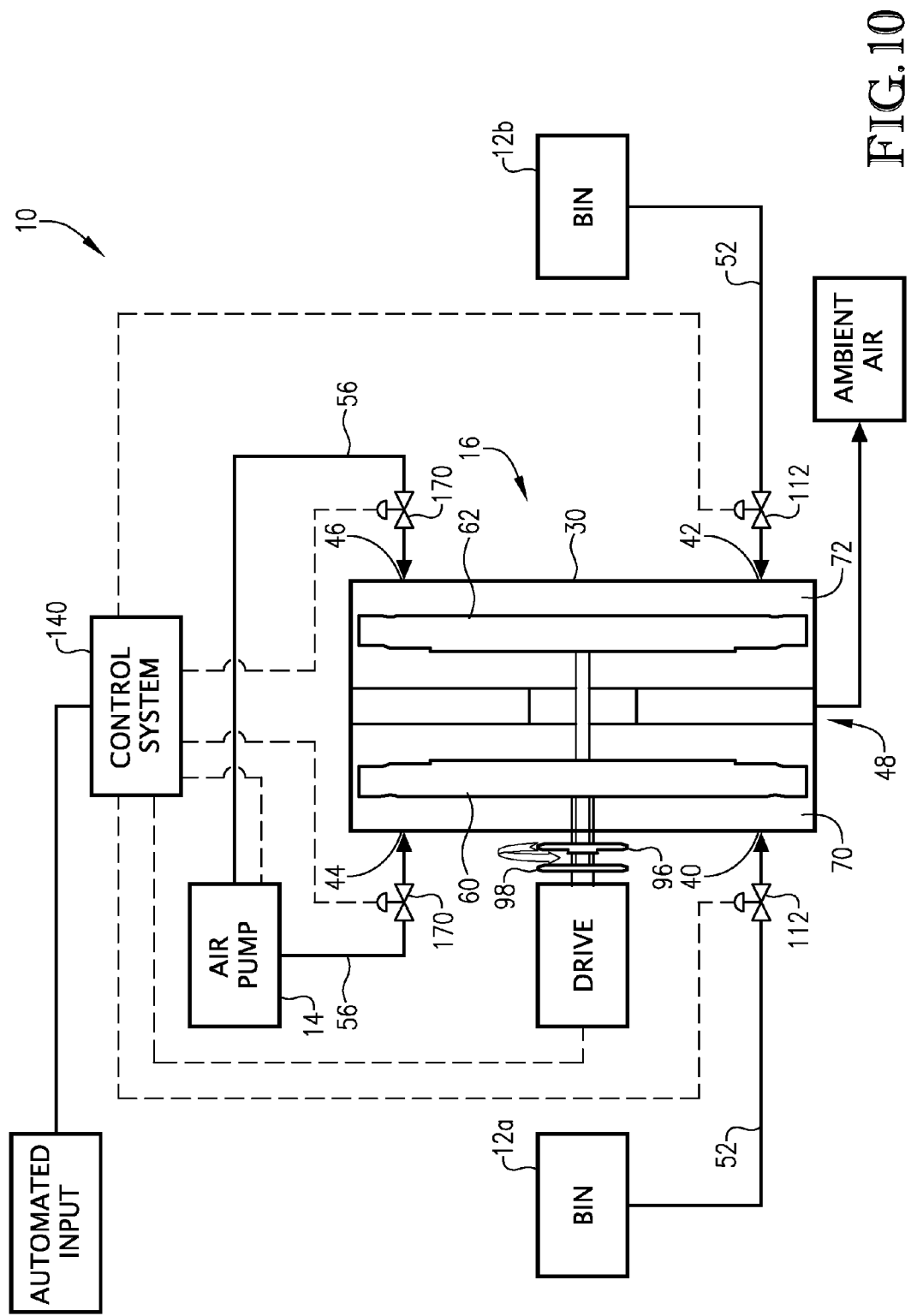
FIG. 10 is a schematic representation of a dual-seed metering system operating under a positive air-pressure according to one embodiment of the present invention.

Given the above provided description, the dual-seed metering system 10 is operable to alternatively dispense two or more different types of seeds within a field for planting. In some embodiments, to control which type of seed is dispensed, an electro-mechanical control system comprising a processor, microprocessor, microcontroller, memory elements, and/or the like is used. For instance, as shown in FIG. 10, a control system 140 is operable to selectively control the rotation of each of the first and second drive components 96, 98, so as to thereby selectively control the rotation of the first and second metering discs 60, 62. As described above, rotation of the first metering disc 60 causes the first type of seed to be dispensed, while rotation of the second metering disc 62 causes the second type of seed to be dispensed. In some embodiments, the control system 140 is directed manually by manual inputs, such as by buttons, knobs, switches, or the like. In such embodiments, the user can manually select whether to dispense either the first type of seed or the second type of seed by selecting the appropriate manual input. In other embodiments, the control system 140 is directed automatically by one or more automated and/or sensory inputs. Such automated inputs may include for instance: timers/clocks, global positioning system (GPS), temperature sensor, moisture sensor, soil-type sensors, bin 12 fill level, soil fertility sensors, soil pH sensors, or the like. In such instances, when the automated inputs receive a particular input, the control system 140 directs the dual-seed metering system 10 to dispense either a first type of seed or a second type of seed. Furthermore, the control system 140 may also be able to control the rate at which the seeds are dispensed from the seed meter 16. For instance, the control system 140 may be able to control the rate at which the metering discs 60, 62 rotate, and thereby the rate at which the seeds are dispensed form the seed meter 16. In some embodiments, different types of seeds or different soil types require more or less numbers of seeds to be planted over a given area of the field. As such, the control system 140 may instruct the metering discs 60, 62, via the drive components 96, 98, to rotate faster when a more densely populated seed dispensing rate is required or slower when a less densely populated seed dispensing rate is required.

Remaining with FIG. 10, in some embodiments, the control system 140 may also be able to control the amount of seed being introduced into the seed meter 16. For instance, the control system 140 may be able to control each of the valves 112 associated with allowing the seeds to be introduced the first and second interior sides 70, 72, respectively. In some embodiments, different types of seeds are required to be introduced into the housing 30 at different rates. For instance, larger seeds may be required to be introduced into the housing at a faster rate so as to maintain the seed pool cavity 110 at a sufficient capacity. As such, the control system 140 may instruct the valve 112 to allow the seeds to be introduced at a higher rate (e.g., actuate the valve 112 to a more open position). Similarly, control system 140 may also be able to control the amount and/or the air-pressure of the air being introduced into the seed meter 16. For instance, the control system 140 may be able to control valves 170 associated with air conduits 56 for purposes of controlling the pressurized air introduced the first and second interior sides 70, 72, respectively. In some embodiments, different types of seeds require different air-pressures to be retained within the seed pockets 80 of the metering discs 60, 62. For instance, larger and heavier seeds may require a higher air-pressure within the housing 30 so as to be retained within the seed pockets 80. As such, the control system 140 may instruct the pressure differential device 14 to create such a higher air-pressure (or, alternatively, may instruct the valves 170 to actuate into a more open position) when the larger and heavier seeds are being planted from the seed meter 14. Similarly, the control system 140 may instruct the pressure differential device 14 to create such a lower air-pressure (or, alternatively, may instruct the valves 170 to actuate into a more closed position) when the smaller and lighter seeds are being planted from the seed meter 14.

As an example of dual-seed planting method via embodiments of the present invention, a field may be divided up into two or more regions (i.e., sections), with each region requiring a different type of seeds to be planted therein. As such, the dual-seed metering system 10 may be used to plant a first type of seed in a first region of the field and a second type of seed in a second region of the field. In some embodiments, a user that is operating the dual-seed metering system 10 via the seed planting machine 20 may manually select (e.g., by actuating a button) for the metering system 10 to dispense the first type of seed while in the first region of the field. Alternatively, when the seed planting machine 20 is in the second region of the field, the user can manually select for the metering system 10 to dispense the second type of seed.

As an additional example, dual-seed planting may be controlled automatically by the position of the seed planting machine 20, such as for instance by a location determined by GPS. In such embodiments, when the seed planting machine 20 is positioned within the first region of the field (as determined by a GPS associated with the seed planting machine 20) the control system 140 directs the metering system 10 to plant the first type of seed. Alternatively, when the seed planting machine 20 is positioned within the second region of the field (as determined by GPS), the control system 140 directs the metering system 10 to plant the second type of seed.

When transitioning from dispensing the first type of seed to the dispensing the second type of seed, the control system 140 may instantaneously switch from driving first drive component 96 (and thus the first metering disc 60) to driving the second drive component 98 (and thus the second metering disc 62), or vice-versa. In other embodiments, as described below, certain transitions will not take place instantaneously. Instead, one or more of the components on both sides of the seed meter 16 will remain active through the transition period. As such, embodiments of the present invention provide for a seamless transition between the planting of a first type of seed to the planting of a second type of seed.

For example, in some embodiments, the transition of the metering system 10 from planting the first type of seed to planting the second type of seed will take a non-instantaneous transition period. Such a transition period may be due to various factors, such as the time required for the metering discs 60, 62 to make a complete revolution around the housing 30 when starting from a static, non-rotating position. To permit the metering system 10 to seamlessly transition between planting the first type of seed to planting the second type of seed (i.e., such the seed meter 16 is always dispensing seed), even through the transition period, embodiments of the present invention may provide for both of the first and second metering discs 60, 62 to be active at the same time. As an illustrative example, if the control system 140 determines that the seed planting machine 20 is approaching the second region of the field, such that the metering system 10 needs to transition from dispensing the first type of seed to dispensing the second type of seed, the metering system 10 can maintain rotation of the first metering disc 60, such that the first type of seeds will continue to be (1) maintained within the seed pockets 80 on the outer-facing surface 64 of the first metering disc 60, and (2) dispensed through the dispensing tube 130. In addition, the metering system 10 will start the rotation of the second metering disc 62, such that the second type of seeds will begin to be (1) maintained within the seed pockets 80 on the outer-facing surface 66 of the second metering disc 62. As such, the system will continue dispensing the first type of seed while the second type of seed begins to be collected/maintained within the seed pockets 80 on the outer-facing surface 66 of the second metering disc 62. Embodiments may provide for the first metering disc 60 to continue rotating (and thus dispensing the first type of seed) for the entirety of the transition period (e.g., the time required for the second metering disc 62 to make one complete revolution). Once the transition period has ended, the second type of seed will have been collected/maintained within the outer-facing surface 66 of the second metering disc 62 and will begin to be dispensed from the dispensing tube 130 for planting. Upon the expiration of the transition period, the control system 140 will stop the rotation of the first metering disc 60, such that the first type of seeds will stop being dispensed, and only the second type of seed will be dispensed.

Because of the rotation speed of the metering discs 60, 62 and the spacing of adjacent seed pockets 80, a distance that can be travelled by the seed planting machine 20 during a full rotation of the metering discs 60, 62 can be determined. As such, embodiments can provide for such a distance to be programmed into the control system 140, such that the control system 140 can begin transitioning from dispensing the first type of seed to dispensing the second type of seed precisely at the required time. In such a manner, the metering system 10 can be configured so as to not dispense more than one type of seed at a time and/or configured to always dispense at least one type of seed at any time during the transition period.

In certain embodiments, the metering system 10 may be configured such that there is no, or only a nominal, transition period. In such embodiments, each of the metering discs 60, 62 may be configured in an initial "primed" configuration. A primed configuration is defined as a configuration in which at least a majority of each of the seed pockets 80 on each of the metering discs 60, 62 has seed therein. To accomplish such, each of the metering discs 60, 62 are caused to rotate by the control system 140, via actuation of the first and second drive components 96, 98. As such, the metering discs 60, 62 rotate through the seed pool cavities 110 and pick up seed in the seed pockets 80. Pressurized air is introduced to each of the interior sides 70, 72 of the housing 30 via the first and second air inlets 44, 46, respectively, by the pressure differential device 14 so as to maintain the seeds in the seed pockets 80. Each of the first and second metering discs 60, 62 will perform approximately one revolution through the housing 30, such that a majority of the seed pockets 80 include seeds therein. As such, the metering discs 60, 62 will be in a "primed" position, such that as soon as either of the metering discs 60, 62 are caused to rotate from the primed position, it will begin to dispense seed into the dispensing tube 130. In such a configuration, the transition period can be significantly reduced or eliminated.

In some embodiments, as shown in FIG. 6, the metering system 10 will include a seed counting sensor 142 associated with the dispensing tube 130. The seed counting sensor 142 may comprise a laser sensor, a radio-frequency sensor, a limit switch, a mechanical counter, or the like. Such a seed counting sensor 142 may be electrically connected with the control system 140 so as to alert the user of the metering system 10 when there is problem with the distribution of seeds from any of the dual-seed meters 16 included within the metering system 10.

In some embodiments of the present invention, such as illustrated in FIGS. 1-2, the seed planting machine 20 will include a plurality of dual-seed meters 16, with each seed meter 16 capable of dispensing at least two different types of seed. The seed meters 16 may be situated linearly across a width of the frame 22, such that the seed planting machine 20 is capable of dispensing seeds in a plurality of single rows. Specifically, each of the seed meters 16 is capable of dispensing two different types of seed into a single row via a single dispensing tube 130. In some embodiments, the seed planting machine 20 may include a plurality of pairs of seed meters 16 (a pair of seed meters 16 is shown in FIG. 3) attached linearly across a width of the frame 22. In such embodiments, the seed planting machine 20 is capable of dispensing seeds in a plurality of twin rows. Such twin row planting may be beneficial, for instance, for increasing crop yields.

Furthermore, in certain instances, it may be preferable to dispense a first type of seed along a first group of the rows and a second type of seed along a second group of the rows. As an illustrative example, the seed planting machine 20 may include twenty (20) dual-seed meters arranged linearly along a width of the seed planting machine 20, with the left-most dual-seed meter being the 1st seed meter and the right-most seed meter 16 being the 16th seed meter. Embodiments of the present invention provide for each of seed meters 16 to be individually controllable, via the control system 140, to dispense either a first type of seed or a second type of seed on a given row.

As a more detailed illustration, the seed planting machine 20 described above may be traveling through a region of a field that requires each of the dual-seed meters 1-20 to dispense the first type of seed. Subsequently, the seed planting machine 20 may approach a particular region of the field that requires a second type of seed to be dispensed via dual-seed meters 11-20. Such a determination may be made, for instance, by a sensors that receives an indication that the upcoming pH level of the soil in the particular section of the field suggests that the second type of seed is preferred over the first type of seed. As such, the control system will instruct the dual-seed meters 11-20 to transition from dispensing the first type of seed to dispensing the second type of seed while in the particular region of the field. As such, dual-seed meters 1-10 will continue to dispense the first type of seed, while dual-seed meters 11-20 will dispense the second type of seed. Upon exiting the particular section of the field, dual-seed meters 11-20 may be instructed to transition back to dispensing the first type of seed. Although the above example was provided with respect to dual-seed meters 11-20, it is understood that each seed meter is individually controllable, such that each seed meter can dispense either type of seed, as may be required.

Furthermore, embodiments provide for the control system 140 to control each of the seed meters based on various inputs received from one or more of the sensors discussed above (e.g., timers/clocks, GPS, temperature sensor, moisture sensor, soil-type sensors, bin fill level, soil fertility sensors, soil pH sensors, or the like). For instance, the entire field may be plotted out electronically on a digital map. The field may be divided up into regions that either require the first type of seed to be planted or the second type of seed to be planted. As the seed planting machine 20 travels through the field, a position of the seed planting machine 20 can be determined by GPS, such that the control system 140 can determine whether the seed planting machine 20 is in a region that requires the first type of seed, the second type of seed, or some combination. As such, the control system can instruct the dual-seed meters 16 on the seed planting machine 20 to appropriately dispense either the first type of seed or the second type of seed.

Figure 11:
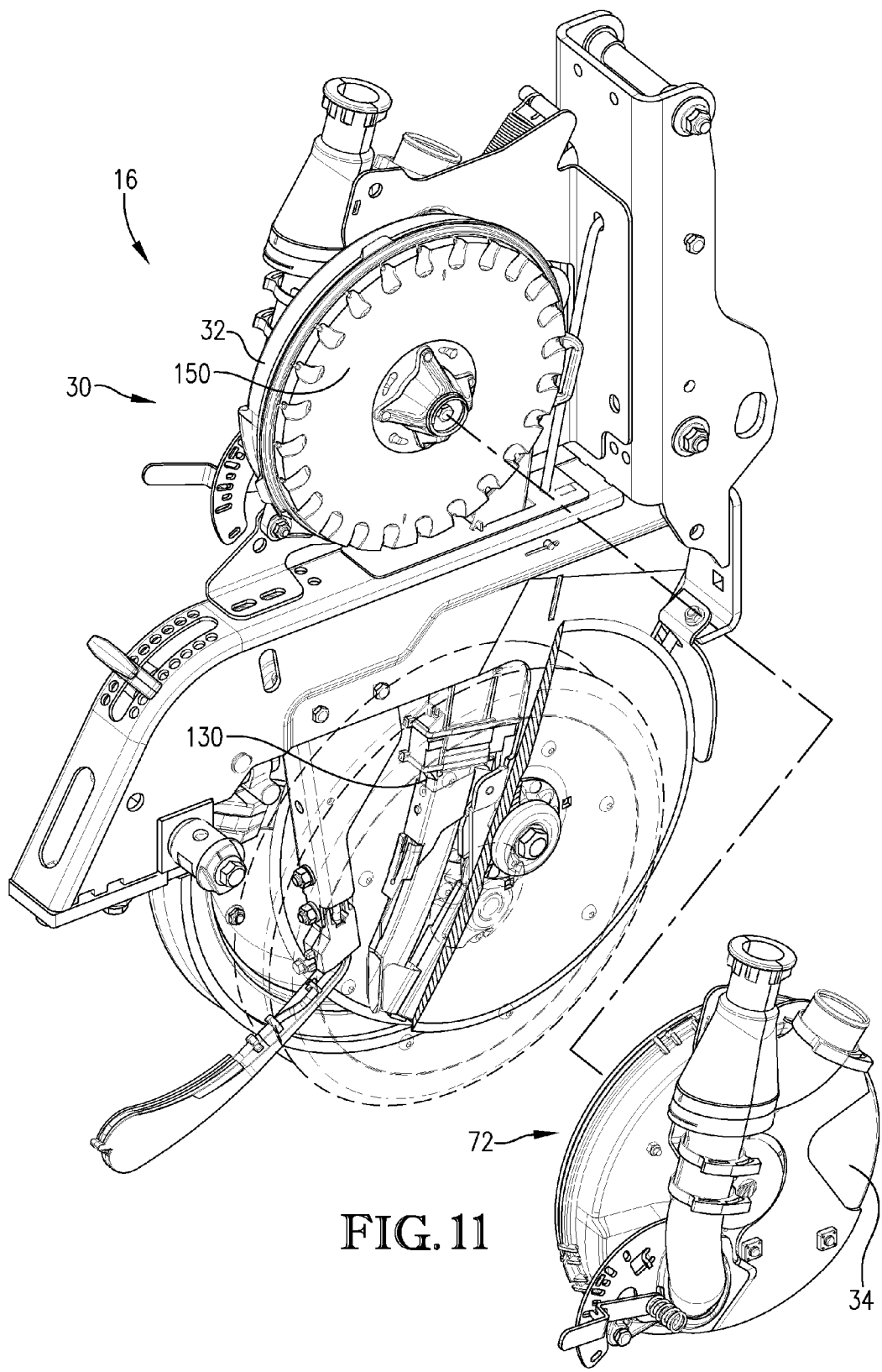
FIG. 11 is a right-side exploded view of a dual-seed meter according to embodiments of the present invention, particularly showing a single metering disc received within a housing.
Figure 12:
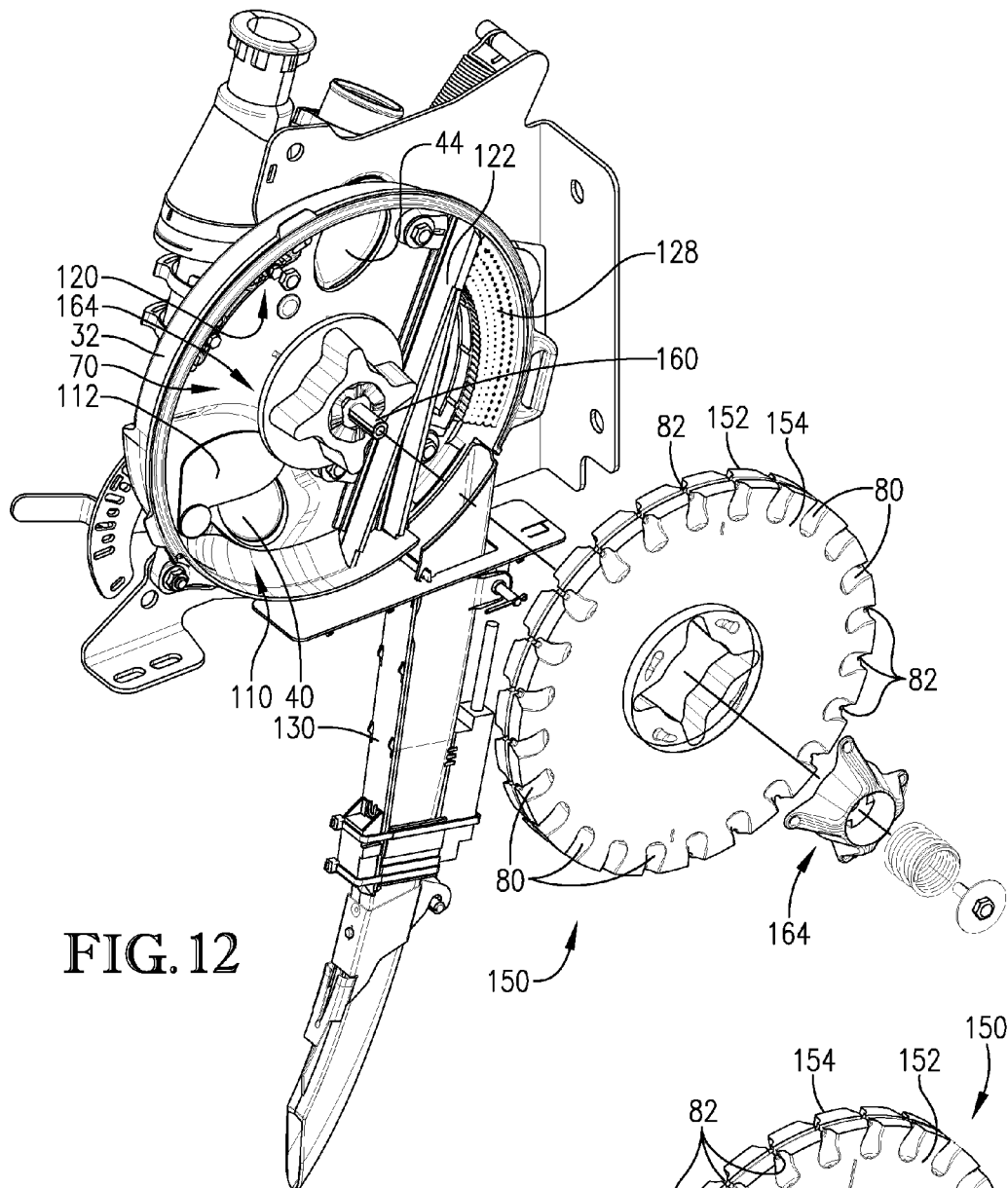
FIG. 12 is a partial right-side exploded view of the dual-seed meter of FIG. 11.
Figure 13:
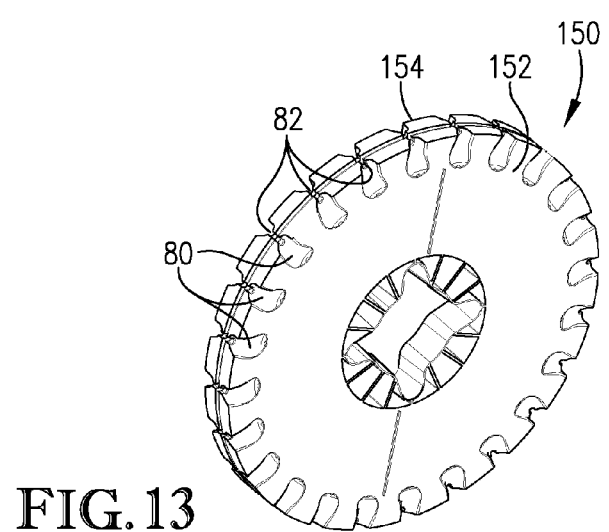
FIG. 13 is a perspective view of the single metering disc from FIGS. 11-12.

The above-provided description of the dual-seed metering system 10 was directed to a dual-seed meter 16 having two rotatable seed metering discs 60, 62. In addition, embodiments of the present invention include a dual-seed meter 16 with a single rotatable seed metering disc 150, as is illustrated in FIGS. 11-13. In more detail, and with reference to FIGS. 12-13, the single metering disc 150 includes a first surface 152 and a second surface 154. The metering disc 150 includes a plurality of seed pockets 80 spaced around a circumference of both of the surfaces 152, 154. As with the first and second discs 60, 62, each the seed pockets 80 includes an air opening 82 at a peripheral edge of the metering disc 150. In some embodiments, the seed pockets 80 on the first surface 152 of the metering disc 150 are aligned with the seed pockets 80 on the second surface 154. In such embodiments, the air openings 82 of the seed pockets 80 on both surfaces of the metering disc 150 are aligned. In other embodiments, the seed pockets 80 on either surface 152, 154 of the metering disc 150 are offset from the seed pockets 80 on the other surface of the metering disc 150, such that the air openings 82 of the seed pockets 80 on each surface 152, 154 of the metering disc 150 are similarly offset. Furthermore, in some embodiments the seed pockets 80 on the first surface 152 of the metering disc 150 may have a first size and shape, and the seed pockets 80 on the second surface 154 may have a second size and shape. The various sizes and shapes may correspond to sizes and shapes necessary to hold and retain various types of seeds. In some embodiments, the first size and shape is the same as the second size and shape.

In some embodiments of the present invention, the metering disc 150 is formed from a solid piece of material. As such, the metering disc 150 may be formed from an injection molding process or the like. In other embodiments, the metering disc 150 may be formed from two or more pieces that are coupled together. For example, the first surface 152 of the metering disc 150 may be part of a first piece that is coupled with the second surface 154 of the metering disc 150, which is part of a second piece.

Regardless of whether the metering disc 150 is formed from one or more pieces, the metering disc 150 is operable to rotate within the housing 30 about a drive assembly with a single axle 160. The single axle 160 extends through the housing 30 and through the metering disc 150. A drive component 162 (See, e.g., FIG. 14) is connected to the single axle 160 exterior to the housing 30 (out of view on FIGS. 11-12). The drive component 162 may comprise sprockets, gears, or other mechanism capable of receiving rotary motion from a drive mechanism, such as a chain, driveshaft, gear assembly, or the like. The drive mechanism may itself receive power from an electric motor, a combustion engine, a hydraulic actuator, a pneumatic actuator, a power takeoff, or various other forms of power generation.

The metering disc 150 is held in place on the single axle 160 via a drive hub 164. The drive hub 164 is operable to impart rotary motion from the single axle 160 to the metering disc 150. The metering disc 150 has an outer diameter that is at least slightly smaller than an inner diameter of the housing 30. The diameter of the metering disc 150 is generally sized such that the metering disc 150 is free to rotate within the housing 30 but does not let solid material, such as seeds, pass from the first interior side 70 of the housing to the second interior side 72. It being understood that the first interior side 70 of the seed meter 16 with the single metering disc 150 extends from the first side 32 of the housing 30 to the first surface 152 of the metering disc 150, whereas the second interior side 72 extends from the second side 34 of the housing 30 to the second surface 154 of the metering disc 150.

The interior workings of the seed meter 16 with the single metering disc 150 are generally the same as were previously described with respect to the seed meter 16 with the first and second metering discs 60, 62. For instance, the first side 32 includes the first seed inlet 40, which receives a first type of seed via seed transport system 50. The first type of seed enters the first seed inlet 40 and fills seed pool cavity 110 of the first interior side 70. A size of the seed pool may be controlled by a valve 112 associated with the first side 32 of the housing 30 operable to control the flow of seeds through the first seed inlet 40, such as a shutter operable to rotatably open or close about the first seed inlet 40. In some embodiments, the valve 112 is actuated by a solenoid, piston, or any other type of actuation mechanism. In some embodiments, the valve 112 may be biased in an open or closed position via a spring. In a closed position, the valve 112 restricts all seed form entering the first interior side 70 into the seed pool cavity 110 through the first seed inlet 40. The valve 112 can be positioned in a plurality of open positions with respect to the first seed inlet 40, with each open position corresponding to a particular amount of seed allowed within the seed pool cavity 110 of the first interior side 70. Furthermore, the seed meter 16 includes tickler brushes 120, air cutoff shelves 122, and air cutoff brushes 128 within and/or associated with each of the first and second sides 32, 34 and/or the first and second interior sides 70, 72 (second interior side 72 not shown in detail in FIGS. 11-12).

Figure 14:
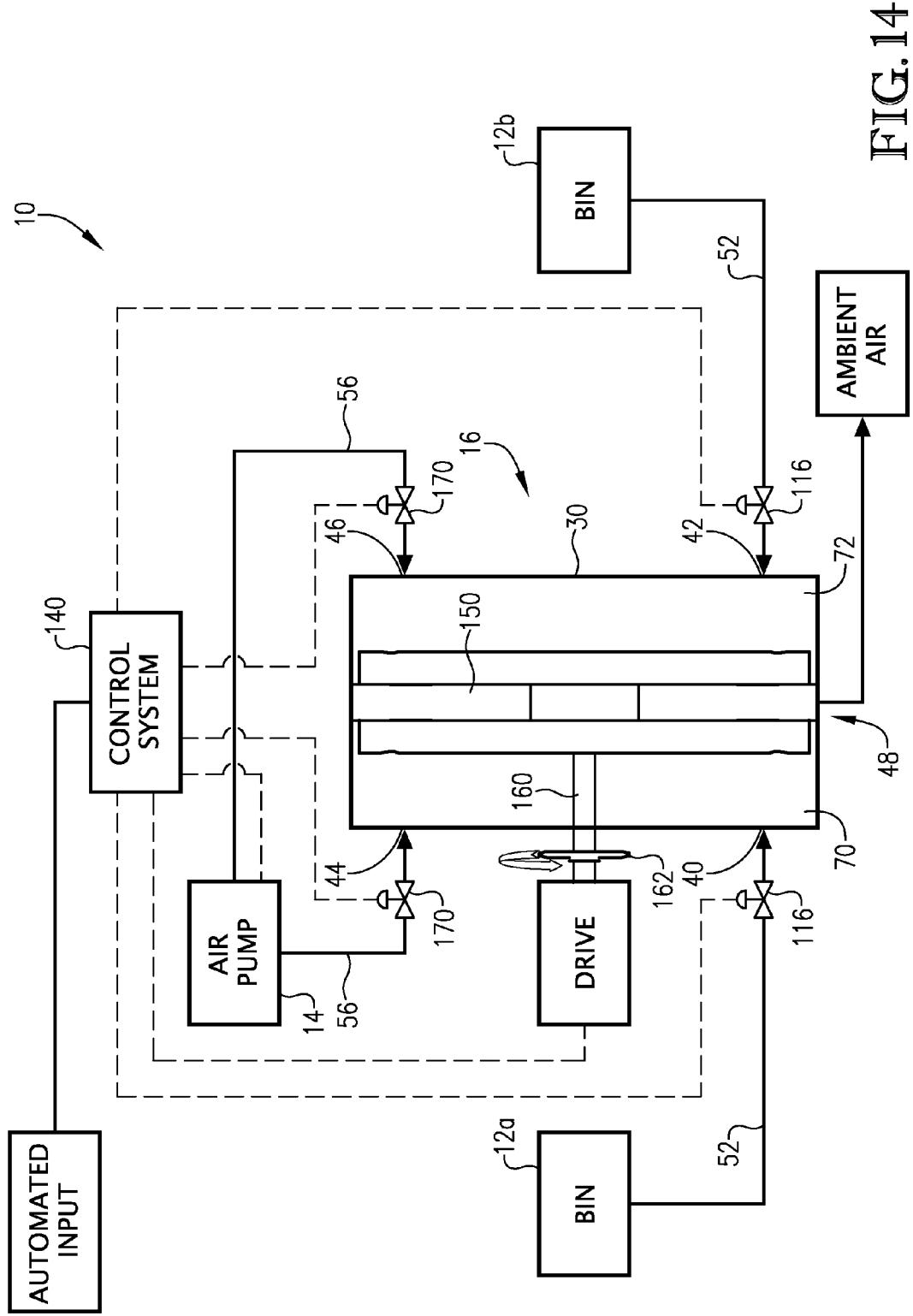
FIG. 14 is a schematic representation of a dual-seed metering system operating under a negative air-pressure according to one embodiment of the present invention.

In operation, and as illustrated schematically in FIG. 14, with the valve 112 associated with the first side 32 in an open position and the seed pool cavity within the first interior side 70 having a corresponding amount of seeds therein, the metering disc 150 is operable to rotate within the housing 30 through the seed pool. As the metering disc 150 rotates, seeds are captured by the seed pockets 80, on the first surface 152 of the metering disc 150, and carried along the rotation of the metering disc 150. The seeds may be retained in the seed pockets 80 via an air-pressure differential provided by the pressure differential device 14 fluidly connected to the first air inlet 44 via the air conduits 56. As such, embodiments provide for a positive air-pressure differential to be produced between the interior of the housing 30 and the exterior of the housing 30. In more detail, the positive air-pressure differential can be created between the first interior side 70 of the interior of the housing 30 and (1) the second interior side 72 of the interior of the housing 30, and (2) the exterior of the housing 30 (i.e., the ambient). As such, the air-pressure within the first interior side 70 will be higher than air-pressure within the second interior side 72 and the ambient atmosphere outside of the housing 30. The air-pressure differential is created via the pressure differential device, which introduces air into the first interior side 70 through the first air inlet 44, via the air conduit 56. The increased air-pressure within the first interior side 70 will cause air to escape from within the housing 30 through the air openings 82 of the seed pockets 80 and, therefrom, to the second interior side 72 and/or through the air vent gap 48 of the housing 30 to the ambient. Such a pressure differential between the first interior side 70 of the housing 30 and the ambient is sufficient to retain the seeds within the seed pockets 80 on the first side 152 of the metering disc 150, as the metering disc 150 rotates about the housing 30.

Figure 15:
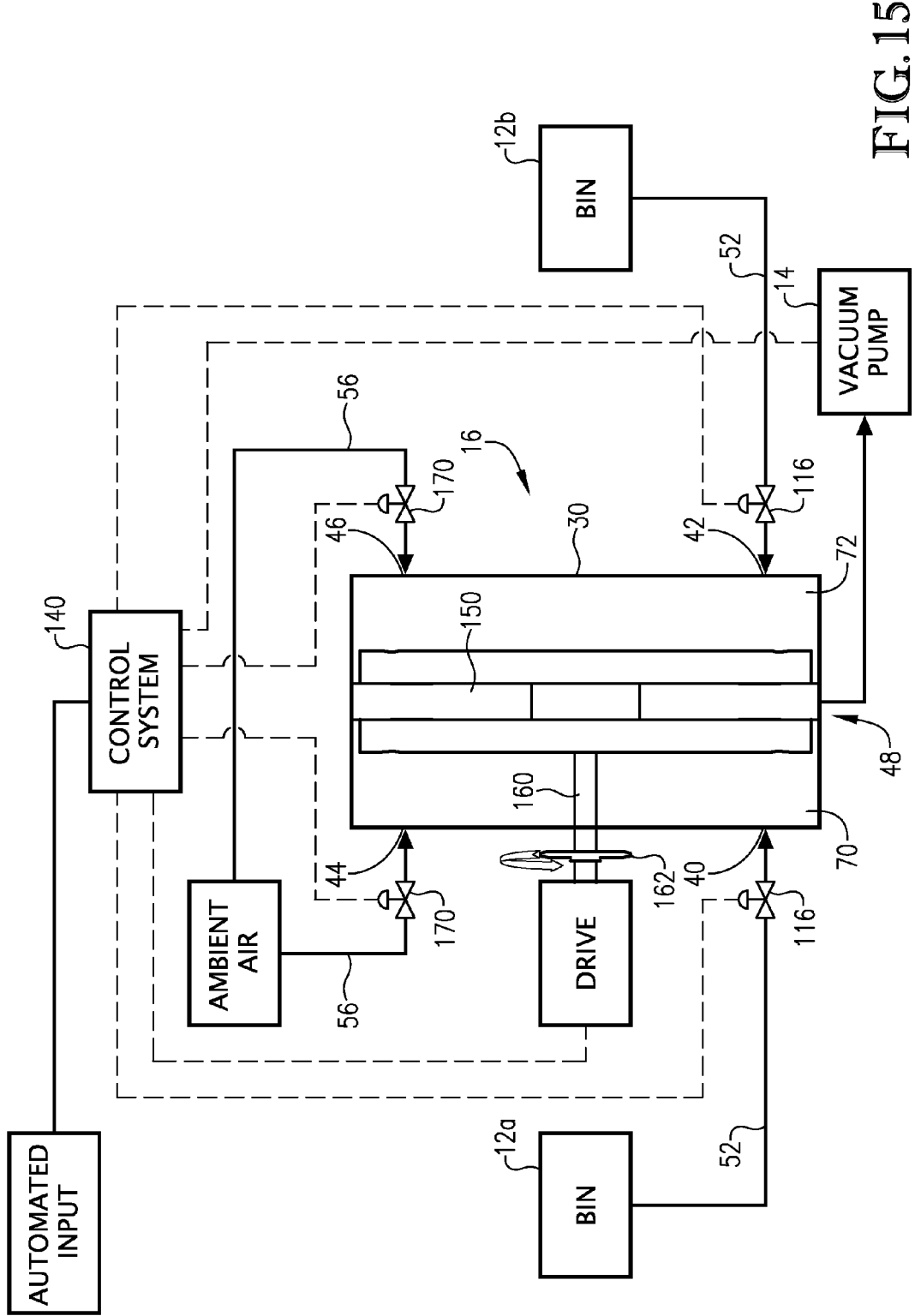
FIG. 15 is a schematic representation of a dual-seed metering system operating under a negative air-pressure according to another embodiment of the present invention.

In a first alternative embodiment, as schematically illustrated in FIG. 15, a negative air-pressure differential can be produced between the interior of the housing 30 and the exterior of the housing 30. As such, the air-pressure within the interior of the housing 30 will be lower than the air-pressure of the ambient atmosphere outside of the housing 30. In more detail, seeds within the first interior side 70 of the housing 30, for example, can be retained in the seed pockets 80, on the first surface 152 of the metering disc 150, via a negative air-pressure differential produced by the pressure differential device 14 (e.g., when the pressure differential device is a vacuum pump). The pressure differential device 14 may be fluidly connected, via an air conduit 56, to the air vent gap 48 positioned on the circumference of the housing 30. As such, the pressure differential device 14 can generate a vacuum that causes the air pressure within the housing 30 to be lower than the ambient air-pressure. In particular, such an air-pressure differential is operable to direct air from exterior to the housing to within the housing 30 through the first and/or second air inlets 44, 46 on the sides 32, 34 of the housing 30, respectively. Regardless, when it is intended for the seed meter 16 to dispense seeds from within the first interior side 70, the pressure differential device 14 will created a vacuum, which causes a lower air-pressure to exist within the first interior side 70 of the housing than the ambient. Furthermore, the air-pressure within the first interior side 70 will be higher than the air-pressure within the air conduit 56 that connects the air vent gap 48 and the pressure differential device 14. As such, air will flow from the first air inlet 44 through the first interior side 70, through the air openings 82 of the seed pockets 80 on the first surface 152 of the metering disc 150, and finally exiting through the air vent gap 48 and through the pressure differential device 14 to the ambient. Such a pressure differential between the first interior side 70 is sufficient to retain the seeds within the seed pockets 80 on the first surface 152, as the metering disc 150 rotates about the housing 30.

In a second alternative negative air-pressure differential embodiment (not illustrated in the drawings), a negative air-pressure differential may be produced between the second interior side 72 of the housing 30 and (1) the first interior side 70 of the interior of the housing 30, and (2) an outside of the housing 30 (i.e., the ambient). As such, the air-pressure within the second interior side 72 will be lower than air-pressure within the first interior side 70 and the ambient atmosphere outside of the housing 30. In more detail, the seeds are retained in the seed pockets 80, on the first surface 152 of the metering disc 150, via a negative air-pressure differential produced by the pressure differential device 14 fluidly connected to the second air inlet 46. In particular, the air-pressure differential is operable to direct air from within the housing 30 through the second air inlet 46 on the second interior side 72 the housing 30, via the air conduit 56. The higher air-pressure (1) within the first interior side 70 of the housing 30, and (2) outside of the housing 30 (i.e., the ambient), will cause air to flow through the air vent gap 48 and through the air openings 82 of the seed pockets 80 on the first surface 152 and into the second interior side 72. Such a pressure differential, according to the alternative negative air-pressure differential embodiment, between the first interior side 70 and the second interior side 72 of the housing 30, is sufficient to retain the seeds within the seed pockets 80 on the first surface 152, as the metering disc 150 rotates about the housing 30.

Although the above-described components were described with respect to the first side 32 and the first interior side 70 of the housing 30, the seed meter 16 includes corresponding components within and/or associated with the second side 34 and the second interior side 72. The components within and/or associated with the second side 34 and the second interior side 72 operate in the same manner as the components within the first side 32 and the first interior side 70, such that seeds introduced into the second interior side 72 are systematically carried, by the seed pockets 80 on the second surface 154 of the metering disc 150 and dropped down the dispensing tube 130.

For example, with the valve 112 associated with the second side 34 in an open position and the seed pool cavity 110 within the second interior side 72 having a corresponding amount of seeds therein, the metering disc 150 is operable to rotate within the housing 30 through the seed pool. As the metering disc 150 rotates, seeds are captured by the seed pockets 80 on the second surface 154 of the metering disc 150, and carried along the rotation of the metering disc 150. The seeds may be retained in the seed pockets 80 via an air-pressure differential provided by the pressure differential device 14 fluidly connected to the second air inlet 46 via the air conduits 56. As such, and as illustrated in FIG. 14, embodiments provide for a positive air-pressure differential to be produced between the interior of the housing 30 and the exterior of the housing 30. In more detail, the positive air-pressure differential can be created between the second interior side 72 of the interior of the housing 30 and (1) the first interior side 70 of the interior of the housing 30, and (2) the exterior of the housing 30 (i.e., the ambient). As such, the air-pressure within the second interior side 72 will be higher than air-pressure within the first interior side 70 and the ambient atmosphere outside of the housing 30. The pressure differential device 14 is, thus, capable of introducing air into the second interior side 72 through the second air inlet 46, via the air conduit 56. The increased air-pressure within the second interior side 72 will cause air to escape from within the housing 30 through the air openings 82 of the seed pockets 80 and eventually to the first interior side 70 and/or through the air vent gap 48 of the housing 30 to the ambient. Such a pressure differential between the second interior side 72 of the housing 30 and the ambient is sufficient to retain the seeds within the seed pockets 80 on the second surface 154 of the metering disc 150, as the metering disc 150 rotates about the housing 30.

In the first alternative embodiment, as illustrated in FIG. 15, a negative air-pressure differential can also be produced between the interior of the housing 30 and the exterior of the housing 30. As such, the air-pressure within the interior of the housing 30 will be lower than the air-pressure of the ambient atmosphere outside of the housing 30. In more detail, seeds within the second interior side 72 of the housing, for example, can be retained in the seed pockets 80 on the second surface 154 of the metering disc 150, via the negative air-pressure differential produced by the pressure differential device 14 (e.g., a vacuum pump). The pressure differential device 14 may be fluidly connected, via an air conduit 56, to the air vent gap 48 positioned on the circumference of the housing 30. As such, pressure differential device 14 can generate a vacuum that causes the air-pressure within the housing 30 to be lower than the ambient air-pressure. In particular, such an air-pressure differential is operable to direct air from the housing 30 exterior to within the housing 30 through the first and/or second air inlets 44, 46 on the sides 32, 34 of the housing 30, respectively. In some embodiments, the air will travel through the air inlets 44, 46 from the air conduits 56 of the pneumatic system 54. Regardless, to dispense seeds from within the second interior side 72, the pressure differential device 14 will create a vacuum, which causes a lower air-pressure to exist within the second interior side 72 of the housing 30 than in the ambient. Furthermore, the air-pressure within the second interior side 72 will be higher than the air-pressure within the air conduit 56 that connects the air vent gap 48 and the pressure differential device 14. As such, air will flow from the second air inlet 46 through the second interior side 72, through the air openings 82 of the seed pockets 80 on the second surface 154 of the metering disc 150, and finally exiting through the air vent gap 48 and the pressure differential device 14 to the ambient. Such a pressure differential between the second interior side 72 is sufficient to retain the seeds within the seed pockets 80 on the second surface 154 of the metering disc 150, as the metering disc 150 rotates about the housing 30.

In the second alternative negative air-pressure differential embodiment (not shown in the drawings), a negative air-pressure differential may be produced between the first interior side 70 of the housing 30 and (1) the second interior side 72 of the interior of the housing 30, and (2) an outside of the housing 30. As such, the air-pressure within the first interior side 70 will be lower than air-pressure within the second interior side 72 and the ambient atmosphere. In more detail, the seeds may be retained in the seed pockets 80, on the second surface 154 of the metering disc 150, via a negative air-pressure differential produced by the pressure differential device 14 (e.g., a vacuum pump) fluidly connected to the first air inlet 44. In particular, the air-pressure differential is operable to direct air from within the housing 30 through the first air inlet 44 on the first interior side 70 the housing 30, via the air conduit 56. The higher air-pressure (1) within the second interior side 72 of the housing 30, and (2) outside of the housing 30, will cause air to flow through the air vent gap 48 and through the air openings 82 of the seed pockets 80 on the second surface 154 and into the first interior side 70. Such a pressure differential, according to the alternative negative air-pressure differential embodiment, between the second interior side 72 and the first interior side 70 of the housing 30, is sufficient to retain the seeds within the seed pockets 80 of the second surface 154, as the metering disc 150 rotates about the housing 30.

In operation, the dual-seed metering system 10 is operable to quickly and efficiently allow a user to dispense (i.e., plant) two or more different types of seed into the soil of a field for planting. For instance, and with reference to FIG. 14, to plant a first type of seed, the valve 112 associated with the first side 32 of the housing 30 is opened, thus allowing for a first type of seed to enter the first interior side 70 via the first seed inlet 40 (the first type of seed may be received from an individual bin 12a or from an individual compartment within a bin 12 holding a plurality of types of seeds in each compartment). In certain embodiments, an air-pressure differential is produced with respect to the first interior side 70 of the housing 30, via the first air inlet 44 (in the case of the positive air-pressure differential embodiment described above or in the case of the first negative air-pressure differential embodiment described above) or via the second air inlet 46 (in the case of the second negative air-pressure differential embodiment described above). As such, the metering disc 150 is operable to carry/retain the first type of seeds within the seed pockets 80 on the first surface 154 of the metering disc 150, such that the seeds can be systematically dispensed down the dispensing tube 130 and into the ground soil. As discussed above, in the alternative second air-pressure differential embodiment, the metering disc 150 may be operable to carry/retain the first type of seeds within the seed pockets 80 on the first surface 154 of the metering disc 15 by the negative air-pressure differential produced with respect to the second interior side 72 of the housing 30 via the second air inlet 46.

To begin planting a second type of seed, the first type of seed is stopped from being introduced to the first interior side 70, such as by closing the valve 112 to the first seed inlet 40. Similarly, the pressure differential is stopped from being produced with respect to the first interior side 70 via the first air inlet 28 (in the case of the positive air-pressure differential embodiment describe above or in the case of the first negative air-pressure differential embodiment described above) or via the second air inlet 46 (in the case of the second negative air-pressure differential embodiment described above). In some embodiments, the pressure differential is controlled via a valve 170 (e.g., a flap or shutter) within the pressure differential device 14, a valve 170 within the air conduits 56, or alternatively, via a valve 170 that is operable to selectively block or allow air to be introduced/removed via the first air inlet 44 and/or the second air inlet 46. Because of the lack of a pressure differential associated with the first interior side 70, the seeds will not remain within the seed pockets 80 of the first side 152 of the metering disc 150 as the metering disc 150 rotates. Instead, the seeds will simply fall out of the seed pockets 80 back down into the seed pool.

With the components of the seed meter 16 associated with the first interior side 70 configured to halt the first type of seed from being dispensed, the components associated with the second interior side 72 are configured to allow a second type of seed to be dispensed from the seed meter 16. In more detail, the valve 112 on the second side 34 of the housing 30 is opened, thus allowing for a second type of seed to enter the second interior side 72 via the second seed inlet 42 (the second type of seed may be received from an individual bin 12b or from an individual compartment within a bin 12 holding a plurality of types of seeds in each compartment). An air-pressure differential is similarly produced with respect to the second interior side 72 of the housing 30, via the second air inlet 46 (in the case of a positive air-pressure differential embodiment as described above or in the case of the first negative air-pressure differential as described above) or via the first air inlet 44 (in the case of the second negative air-pressure differential embodiment described above) such that the metering disc 150 is operable to carry/retain the second type of seeds within the seed pockets 80 on the second surface 154, such that the seeds can be systematically dispensed down the dispensing tube 130 and into the ground soil. The pressure differential is produced with respect to the second interior side 72 via a valve 170 (e.g., flap or shutter) within the pressure differential device 14, a valve 170 within the air conduits 56, or alternatively, via a valve 170 that is operable to block or allow air to be introduced via the second air inlet 46 and/or the first air inlet 44.

Given the above, the dual-seed metering system 10 with the single metering disc 150 is operable to alternatively dispense two or more different types of seeds within a field for planting. In some embodiments, to control which type of seed is dispensed, an electro-mechanical control system comprising a processor, microprocessor, microcontroller, memory elements, and/or the like is used. As illustrated by FIG. 14, the control system 140 is operable to control which seeds are introduced to the first and second interior sides 70, 72, by controlling the valves 112 to the seed inlets 40, 42. Similarly, the control system 140 is operable to control the air-pressure differential produced with respect to the first and/or second interior sides 70, 72, by controlling the valves 170 used to direct the flow of air through the air inlets 44, 46. In some embodiments, the control system 140 is directed manually by manual inputs, such as by buttons, knobs, switches, or the like. In such embodiments, the user can manually select whether to plant either a first type of seed or a second type of seed by selecting the appropriate manual input. In other embodiments, the control system 140 is directed automatically by one or more automated and/or sensory inputs. Such sensory inputs may include for instance: timers/clocks, GPS, temperature sensor, moisture sensor, soil-type sensors, bin fill level, soil fertility sensors, soil pH sensors, or the like. In such instances, when the sensory inputs receive a particular input, the control system 140 directs the metering system 10 to plant either a first type of seed or a second type of seed.

As a first example of planting two different types of seeds via embodiments of the present invention, a field may be divided up into two or more regions, with each region requiring a different type of seeds to be planted therein. As such, the dual-seed metering system 10 may be used to plant a first type of seed in a first region of the field and a second type of seed in a second region of the field. In some embodiments, a user operating the seed planting machine 20 may manually select (e.g., by actuating a button) for the metering system 10 to dispense the first type of seed while in the first region of the field. Alternatively, when the seed planting machine 20 is in the second region of the field, the user can manually select for the metering system 10 to dispense the second type of seed.

As a second example, dual-seed planting may be controlled directly by the position of the seed planting machine 20, such as for instance by a location determined by GPS. In such embodiments, when the seed planting machine 20 is positioned within the first region of the field (as determined by GPS) the control system 140 directs the metering system 10 to plant the first type of seed. Alternatively, when the seed planting machine 20 is positioned within the second region of the field (as determined by GPS), the control system 140 directs the metering system 10 to plant the second type of seed.

When transitioning from dispensing the first type of seed to the dispensing the second type of seed, the control system 140 may instruct the metering system 10 may instantaneously switch from the air-pressure differential being produced via the first air inlet 44 to being produced via the second air inlet 46 (or vice-versa). Similarly, the first type of seed may instantaneously be stopped from entering the first seed inlet 40, and the second type of seed instantaneously introduced through the second seed inlet 42. In any intervening time between the dispensing of the first and second types of seeds (i.e., the transition period), some embodiments provide for the metering disc 150 to stop rotating. In other embodiments, as described below, certain transitions will not take place instantaneously. Instead, one or more of the components on both sides of the seed meter 16 will remain active through the transition. As such, embodiments of the present invention provide for a seamless transition between the planting of a first type of seed to the planting of a second type of seed.

For example, in some embodiments, the transition of the metering system 10 from planting the first type of seed to planting the second type of seed will take a non-instantaneous transition period. Such transition period being due, in some embodiments, to various factors, such as: the time for seed to be delivered to the seed meter 16 from the bin 12; the time for the metering disc 150 to make a complete revolution around the housing 30; or various other transition-related issues (e.g., timing of valves 112, 170). To permit the metering system 10 to seamlessly transition between planting the first type of seed to planting the second type of seed (i.e., such that the seed planting machine 20 is always dispensing seed), even through the transition period, embodiments of the present invention may provide for various components associated with both sides 32, 34 of the seed meter 16 to be active at the same time. As an illustrative example (with respect to an embodiment in which a positive air-pressure differential is produced), if the control system 140 determines that the seed planting machine 20 is approaching the second region of the field, such that the metering system 10 needs to transition from dispensing the first type of seed to dispensing the second type of seed, the metering system 10 can maintain the air-pressure differential being introduced via the first air inlet 44 even while the air-pressure differential and the second type of seed are being introduced via the second air inlet 46 and the second seed inlet 42, respectively. With the metering disc 150 continuing to rotate during the transition period, the first type of seeds will continue to be (1) maintained within the seed pockets 80 on the first surface 152 of the metering disc 150, and (2) dispensed through the dispensing tube 130. As such, the system will continue dispensing the first type of seed while the second type of seed begins to be collected/maintained within the seed pockets 80 on the second surface 154 of the metering disc 150. Embodiments may provide for the air-pressure differential to continue to be introduced via the first air inlet 44 for the entirety of the transition period. Once the transition period has ended, the second type of seed will have been collected/maintained within the seed pockets 80 second surface 154 of the metering disc 150 and positioned over the dispensing tube 130 for planting. Upon the expiration of the transition period, the air-pressure differential will stop being introduced via the first air inlet 44, such that the first type of seeds will stop being dispensed, and only the second type of seed will be dispensed.

Because of the rotation speed of the metering disc 150 and the spacing of adjacent seed pockets 80, a distance that can be travelled by the seed planting machine 20 during a full rotation of the metering disc 150 can be determined. As such, embodiments provide for such distances to be programmed into the control system 140, such that the control system 140 can begin transitioning the dual-seed meter 16 from dispensing the first type of seed to dispensing the second type of seed precisely at the required time. In such a manner, the metering system 10 can be configured to never dispense more than one type of seed at a time and/or configured to always dispense at least one type of seed at any time during the transition period.

Although the invention has been described with reference to the exemplary embodiments illustrated in the attached drawings, it is noted that equivalents may be employed and substitutions made herein without departing from the scope of the invention as recited in the claims.

The invention claimed is:

1. A seed meter comprising:
a housing including a first air inlet and a second air inlet for receiving air into said housing, wherein said first air inlet is located on a first side of said housing and said second air inlet is located on a second side of said housing;
a first metering disc and a second metering disc, each rotatably received in said housing, wherein said first and second metering discs are received within said housing between said first and second air inlets, such that said first metering disc faces said first air inlet and said second metering disc faces said second air inlet;
a drive assembly for rotating said first metering disc and said second metering disc,
wherein said first and second metering discs are independently rotatable about a common rotational axis presented by said drive assembly, wherein said drive assembly comprises an outer axle configured to rotate said first metering disc and an inner axle configured to rotate said second metering disc, wherein said inner axle is at least partially received within said outer axle,
wherein each of said first and second metering discs comprises seed pockets for receiving seeds therein;
a first seed inlet and a second seed inlet, wherein said first seed inlet is located on the first side of said housing and said second seed inlet is located on the second side of said housing; and
a pressure differential device for producing an air-pressure differential, via said first and second air inlets, between an interior of said housing and an exterior of said housing.

2. The seed meter of claim 1, wherein said pressure differential device comprises an air pump.

3. The seed meter of claim 1, wherein said housing includes seed pool cavities between the first side of said housing and said first metering disc and between the second side of said housing and said second metering disc, wherein said seed pool cavities are configured to receive seeds from said first and/or second seed inlets.

4. The seed meter of claim 3, wherein said drive assembly further includes first and second drive components, wherein said drive assembly is configured such that a rotation of said first drive component causes a corresponding rotation of said first metering disc and a rotation of said second drive component causes a corresponding rotation of said second metering disc.

5. The seed meter of claim 4, further comprising a control system for controlling the drive assembly, so as to be operable to selectively rotate said first metering disc and said second metering disc.

6. The seed meter of claim 5, wherein said control system includes a manual control input.

7. The seed meter of claim 5, wherein said control system includes an automated control input based on a global positioning system input corresponding to a position of the seed meter.

8. The seed meter of claim 4, wherein each of said seed pockets is configured to pick up at least one seed therein as the seed pocket rotates through the seed pool cavities.

9. The seed meter of claim 8, wherein seeds are configured to be retained within the seed pockets by the air-pressure differential created by said pressure differential device.

10. The seed meter of claim 8, further comprising a dispensing tube for receiving seeds from said seed pockets and dispensing the seeds from said seed meter.

11. A seed planting machine comprising:
a frame configured to be transported by a tractor;
one or more seed bins configured to hold at least a first seed type and a second seed type;
a plurality of dual-seed meters secured to said frame, wherein each of said dual-seed meters is configured to dispense the first seed type and the second seed type from a single dispensing tube into a single row within a field,
wherein each of said dual-seed meters includes a housing including a first air inlet and a second air inlet for receiving air into said housing, wherein said first air inlet is located on a first side of said housing and said second air inlet is located on a second side of said housing, wherein each of said dual-seed meters includes a first metering disc for dispensing the first type of seed and a second metering disc for dispensing the second type of seed, with each metering disc rotatably received in said housing of its respective dual seed meter, wherein said first and second metering discs of each dual-seed meter are received within said housing between said first and second air inlets of said housing, such that said first metering disc faces said first air inlet of said housing and said second metering disc faces said second air inlet of said housing, wherein each of said first and second metering discs of said dual-seed meters comprises seed pockets for receiving seeds therein;

a drive assembly for rotating said first metering disc and said second metering disc, wherein said first and second metering discs are independently rotatable about a common rotational axis presented by said drive assembly, wherein said drive assembly comprises an outer axle configured to rotate said first metering disc and an inner axle configured to rotate said second metering disc, wherein said inner axle is at least partially received within said outer axle, wherein each of said dual-seed meters includes a first seed inlet and a second seed inlet, wherein said first seed inlet is located on the first side of said housing of said dual seed meter and said second seed inlet is located on the second side of said housing of said dual seed meter; and a pressure differential device for producing an air-pressure differential between an interior and an exterior of said housing of each dual-seed meter, with the air-pressure differential for each dual-seed meter being produced through said first and second air inlets of said housing of said dual-seed meter.

12. The seed planting machine of claim 11, further comprising a seed transportation system for transporting the first and second types of seeds to each of the dual-seed meters from the one or more seed bins.

13. The seed meter of claim 12, wherein the seed transportation system comprises a plurality of conduits connecting the one or more seed bins to each of the dual-seed meters.

14. The seed planting machine of claim 11, wherein said pressure differential devices is part of a pneumatic system for providing pressurized air to each of the dual-seed meters.

15. The seed planting machine of claim 14, wherein the pneumatic system further comprises a plurality of conduits connecting the pressure differential device to each of the dual-seed meters.

16. The seed planting machine of claim 11, further comprising power generation system for providing rotary power to each of the dual-seed meters, wherein each of the dual-seed meters include a first drive component and a second drive component configured to be selectively rotated via the power generation system, wherein when the first drive component is rotated the dual-seed meter is configured to dispense the first type of seed, and wherein when the second drive component is rotated the dual-seed meter is configured to dispense the second type of seed.

17. The seed planting machine of claim 16, further comprising a control system for selectively causing each of the dual-seed meters to either dispense a first type of seed or a second type of seed based on a position of the seed planting machine.

18. A seed planting machine comprising:

a frame configured to be transported by a tractor;

a first seed bin configured to hold at least a first seed type and a second seed bin configured to hold at least a second seed type; and a plurality of pairs of dual-seed meters secured to said frame, wherein each of said pair of dual-seed meters is configured to dispense the first seed type and the second seed type into a twin row within a field, wherein each of said dual-seed meters includes a housing including a first air inlet and a second air inlet for receiving air into said housing, wherein said first air inlet is located on a first side of said housing and said second air inlet is located on a second side of said housing, wherein each of said dual-seed meters includes a first metering disc for dispensing the first type of seed and a second metering disc for dispensing the second type of seed, with each metering disc rotatably received in said housing of its respective dual seed meter, wherein said first and second metering discs of each dual-seed meter are received within said housing between said first and second air inlets of said housing, such that said first metering disc faces said first air inlet of said housing and said second metering disc faces said second air inlet of said housing, wherein each of said first and second metering discs of said dual-seed meters comprises seed pockets for receiving seeds therein, a drive assembly for rotating said first metering disc and said second metering disc, wherein said first and second metering discs are independently rotatable about a common rotational axis presented by said drive assembly, wherein said drive assembly comprises an outer axle configured to rotate said first metering disc and an inner axle configured to rotate said second metering disc, wherein said inner axle is at least partially received within said outer axle, wherein each of said dual-seed meters includes a first seed inlet and a second seed inlet, wherein said first seed inlet is located on the first side of said housing of said dual seed meter and said second seed inlet is located on the second side of said housing of said dual seed meter; and a pressure differential device for producing an air-pressure differential between an interior and an exterior of said housing of each dual-seed meter, with the air-pressure differential for each dual-seed meter being produced through said first and second air inlets of said housing of said dual-seed meter.

19. The seed planting machine of claim 18, wherein the seed planting machine includes at least four pairs of dual-seed meters secured to said frame.

* * * * *